United States Patent
Fujii et al.

(10) Patent No.: US 10,766,803 B2
(45) Date of Patent: Sep. 8, 2020

(54) METHOD FOR PRODUCING BENT GLASS ARTICLE, AND BENT GLASS ARTICLE

(71) Applicant: AGC Inc., Chiyoda-ku (JP)

(72) Inventors: Makoto Fujii, Tokyo (JP); Satoshi Kanasugi, Tokyo (JP); Naofumi Aoyama, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 65 days.

(21) Appl. No.: 15/703,586

(22) Filed: Sep. 13, 2017

(65) Prior Publication Data

US 2018/0072607 A1   Mar. 15, 2018

(30) Foreign Application Priority Data

Sep. 14, 2016 (JP) ................ 2016-180015
Aug. 30, 2017 (JP) ................ 2017-165903

(51) Int. Cl.
| | |
|---|---|
| C03B 25/02 | (2006.01) |
| C03B 23/025 | (2006.01) |
| C03C 21/00 | (2006.01) |
| C03C 3/085 | (2006.01) |
| C03C 3/083 | (2006.01) |
| C03C 3/087 | (2006.01) |

(52) U.S. Cl.
CPC ........ *C03B 25/025* (2013.01); *C03B 23/0252* (2013.01); *C03B 23/0258* (2013.01); *C03C 21/002* (2013.01); *C03C 3/083* (2013.01); *C03C 3/085* (2013.01); *C03C 3/087* (2013.01); *Y02P 40/57* (2015.11); *Y10T 428/315* (2015.01)

(58) Field of Classification Search
CPC ........ C03C 21/00–002; Y10T 428/315; C03B 25/00–12
See application file for complete search history.

(56) References Cited

U.S. PATENT DOCUMENTS

| | | | |
|---|---|---|---|
| 3,002,321 A | 10/1961 | Dunipace et al. | |
| 3,147,104 A | 9/1964 | Dunipace et al. | |
| 3,607,597 A * | 9/1971 | Ferretti | C03B 27/06 428/122 |
| 5,004,491 A * | 4/1991 | McMaster | C03B 23/03 65/104 |
| 5,385,786 A * | 1/1995 | Shetterly | B32B 17/06 428/432 |
| 6,749,926 B1 * | 6/2004 | Yoshizawa | B60J 1/008 428/174 |

(Continued)

FOREIGN PATENT DOCUMENTS

| | | |
|---|---|---|
| DE | 1 083 515 B | 6/1960 |
| DE | 699 12 519 T2 | 9/2004 |

(Continued)

*Primary Examiner* — Z. Jim Yang
(74) *Attorney, Agent, or Firm* — Oblon, McClelland, Maier & Neustadt, L.L.P.

(57) ABSTRACT

A method for producing a bent glass article includes a heat treatment step of heat-treating a bent glass. The bent glass includes a first main stir-face, a second main surface and an end face. In the heat treatment step, the bent glass is supported by a support jig with one of the main surfaces facing downward. The support jig supports at least a part of one of the main surfaces or the end face in a higher position than the lowest position of one of the main surfaces.

17 Claims, 12 Drawing Sheets

(56) References Cited

U.S. PATENT DOCUMENTS

| | | | |
|---|---|---|---|
| 2003/0000251 A1* | 1/2003 | Tan | C03C 15/025 65/30.13 |
| 2006/0230790 A1* | 10/2006 | Yli-Vakkuri | C03B 25/08 65/269 |
| 2008/0190143 A1 | 8/2008 | Balduin et al. | |
| 2009/0000334 A1* | 1/2009 | Boisselle | C03B 40/005 65/104 |
| 2009/0226733 A1* | 9/2009 | Kato | C03B 25/025 428/428 |
| 2012/0085130 A1* | 4/2012 | Hill | C03B 25/08 65/30.14 |
| 2012/0114901 A1 | 5/2012 | Uraji et al. | |
| 2012/0196110 A1* | 8/2012 | Murata | C03B 25/08 428/220 |
| 2012/0282438 A1* | 11/2012 | Kuhn | C03B 13/08 428/156 |
| 2012/0291490 A1* | 11/2012 | Yamakawa | C03B 23/035 65/29.19 |
| 2014/0290310 A1* | 10/2014 | Green | C03B 27/012 65/112 |
| 2014/0331716 A1* | 11/2014 | Ahmed | C03C 21/002 65/30.14 |
| 2015/0246839 A1* | 9/2015 | Leveque | C03B 25/08 65/106 |
| 2015/0329406 A1* | 11/2015 | Kawamoto | A61J 1/00 428/34.1 |
| 2015/0344346 A1* | 12/2015 | Jiao | C03B 35/187 65/29.11 |
| 2016/0083288 A1 | 3/2016 | Kase et al. | |
| 2016/0145139 A1* | 5/2016 | Fredholm | B32B 17/064 65/29.1 |
| 2016/0145141 A1 | 5/2016 | Bennett | |
| 2016/0368808 A1* | 12/2016 | Rogers | C30B 33/02 |
| 2017/0081243 A1* | 3/2017 | Kim | C03B 23/0307 |
| 2017/0113963 A1* | 4/2017 | Kim | C03B 18/02 |
| 2017/0158546 A1* | 6/2017 | Koo | C03B 23/0307 |
| 2018/0290921 A1* | 10/2018 | Ahmed | H05K 5/03 |
| 2019/0022979 A1* | 1/2019 | Luzzato | B32B 7/12 |
| 2019/0039935 A1* | 2/2019 | Couillard | C03B 23/023 |

FOREIGN PATENT DOCUMENTS

| | | | |
|---|---|---|---|
| DE | 10 2005 001 513 B3 | 6/2006 | |
| EP | 0 960 863 A2 | 12/1999 | |
| JP | 2009179552 A * | 8/2009 | |
| JP | 2011-173781 A | 9/2011 | |
| JP | 5605176 | 10/2014 | |
| WO | WO 2014/196407 A1 | 12/2014 | |
| WO | WO-2015009494 A1 * | 1/2015 | C03B 25/08 |
| WO | WO 2016/019209 A1 | 2/2016 | |

\* cited by examiner

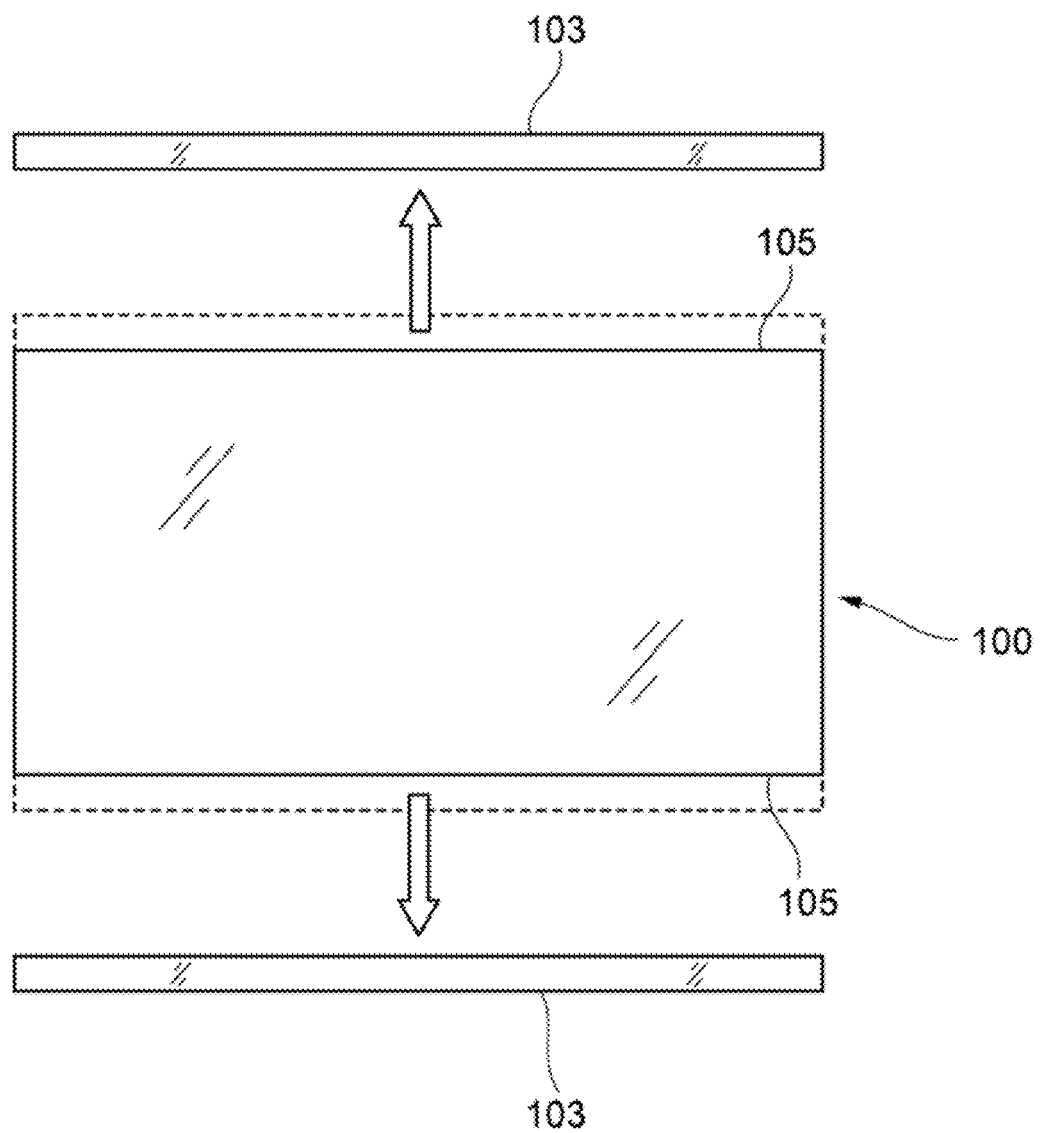

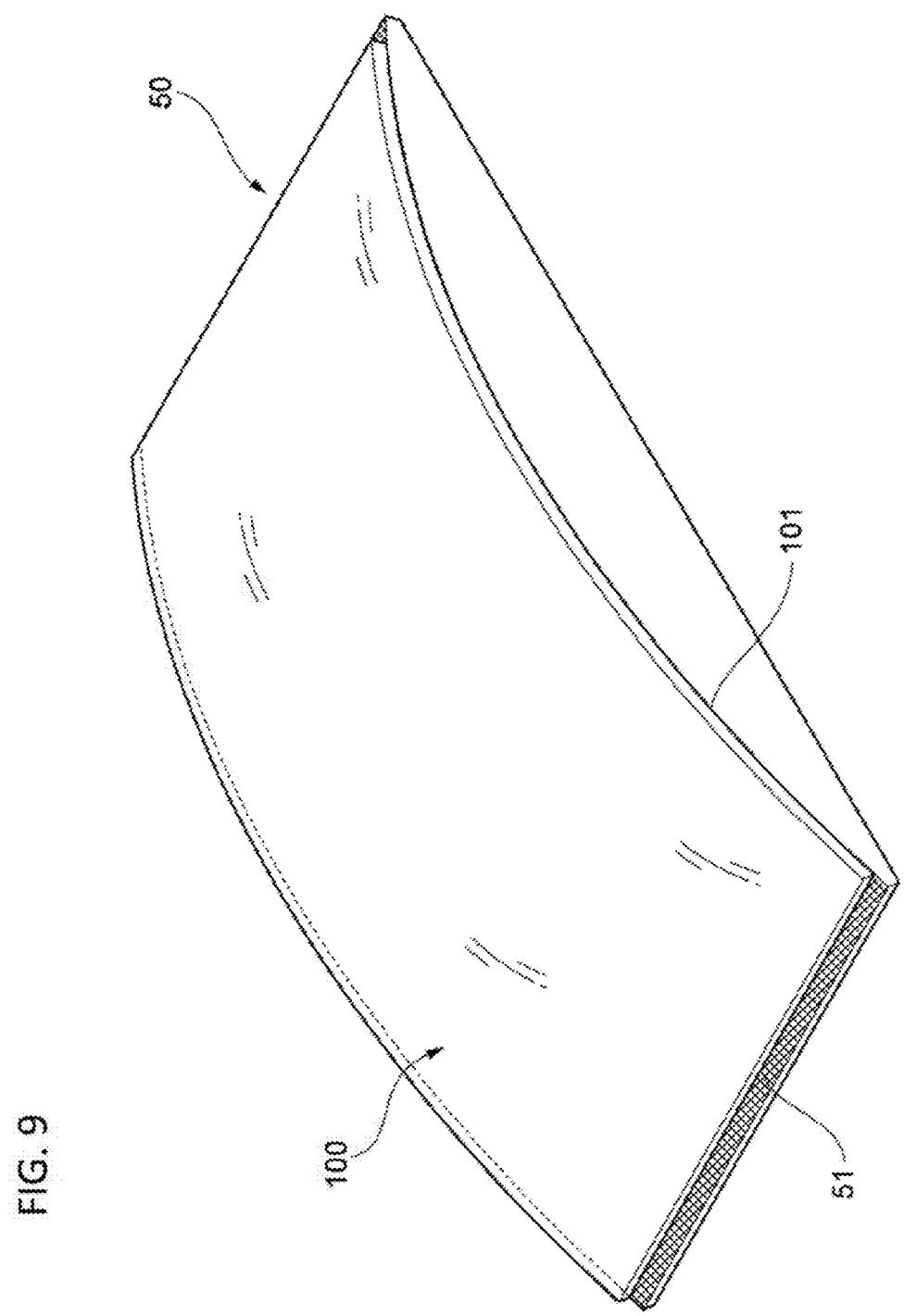

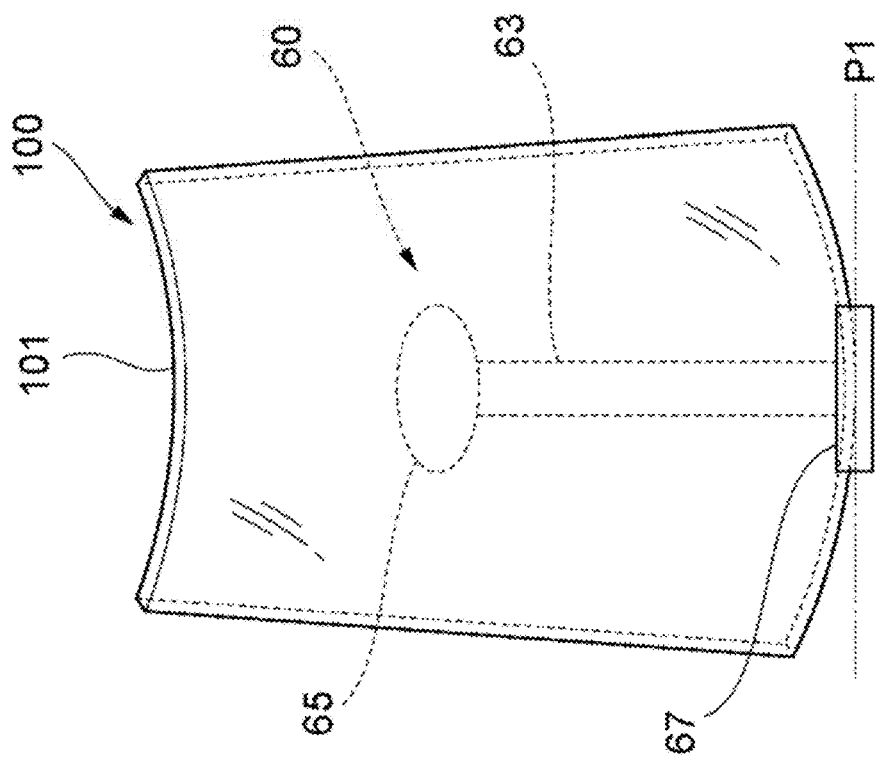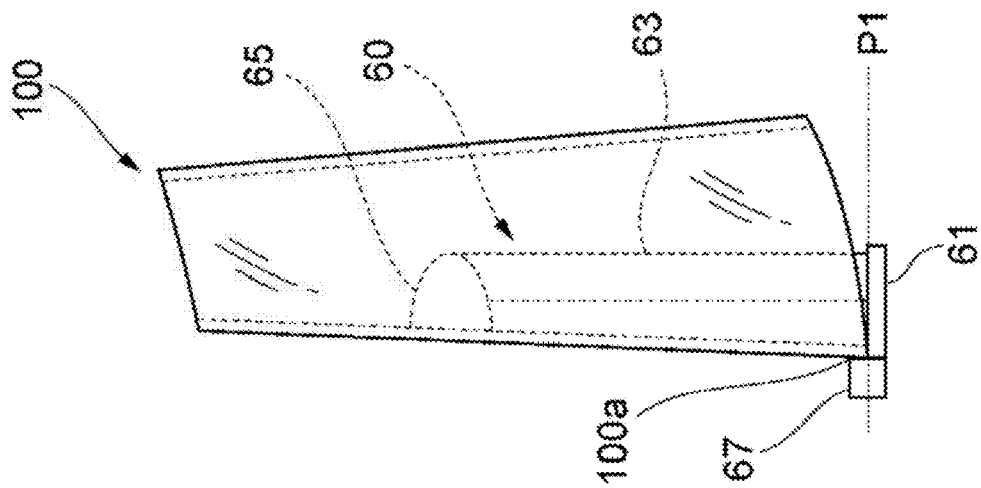

METHOD FOR PRODUCING BENT GLASS ARTICLE, AND BENT GLASS ARTICLE

CROSS-REFERENCE TO RELATED APPLICATIONS

This application claims priority from Japanese Patent Application No. 2016-180015 filed on Sep. 14, 2016 and Japanese Patent Application No. 2017-165903 filed on Aug. 30, 2017, the entire subject matters of which are incorporated herein by reference.

BACKGROUND OF THE INVENTION

Technical Field

The present invention relates to a method for producing a bent glass article, and a bent glass article.

Background Art

Patent Literature 1 discloses a technique in which a sheet glass is formed into a shape having a bent part at a high temperature in order to provide a curvature part in the sheet glass. Patent Literature 1 discloses a method in which the heated sheet glass is bent by its own weight in a heating step during glass forming so as to obtain a cover glass for a flat panel display in which the curvature part has been formed.

Generally, in the forming step of the glass, strain or stress remains in the glass after it has been formed into a desired shape. Therefore, the formed glass has been annealed to thereby remove the residual strain or the residual stress.

Patent Literature 1: Japanese Patent No. 5605176

SUMMARY OF THE INVENTION

In order to relax the residual strain or the residual stress in the formed glass satisfactorily by annealing, it is necessary to heat the glass until equilibrium viscosity thereof reaches $10^{17}$ Pa·S or lower. In that case, however, the glass is softened during the annealing so that the glass can be deformed easily by its own weight. Thus, there is a problem that the shape of the glass formed once cannot be kept without being deformed and deviates from its design dimensions. Particularly, not in a member having a large thickness, such as an optical lens, but in a formed glass having a small thickness and a large size or a formed glass having a complicated shape with a large bending depth and with a twisted part, dimensional accuracy cannot be retained. In addition, in a bent glass with a curvature part, there is a problem that the bent glass may be remarkably distorted when the bent glass is softened. Even when annealing is performed on a bent glass which has been mounted on a mounting base so that only an end face of the bent glass located in the lowest position can contact the mounting base, it has been found that there is a problem that a load caused by the own weight of the bent glass is applied to the contacting part so that the shape of the bent glass can be distorted. In addition, when annealing is performed on the bent glass which has been mounted on the mounting base so that only the end face of the bent glass located in the lowest position can contact the mounting base, it has also been found that there are the following problems; a difference in load is occurred between the contacting part and a part of the bent glass other than the contacting part due to a load on the contacting part and heat exchange between the mounting base and the bent glass in the contacting part; and as a result, the residual strain or the residual stress cannot be removed from a part of the bent glass perfectly; and a distribution may occur in stress strengthened by chemical strengthening in a subsequent step, which leads to the partial reduction in strength in the end face of the bent glass.

Therefore, an object of the present invention is to provide a method for producing a bent glass article, and a bent glass article, capable of a preventing a glass from being deformed by annealing and removing residual strain or residual stress from the formed bent glass.

An aspect of the present invention includes the following embodiments.

(1) A method for producing a bent glass article, comprising:

a heat treatment step of heat-treating a bent glass including a first main surface, a second main surface and an end face, wherein:

in the heat treatment step, the bent glass is supported by a support jig with one of the main surfaces facing downward; and the support jig supports at least a part of one of the main surfaces or the end face in a higher position than the lowest position of one of the main surfaces.

(2) A bent glass article comprising:
a first main surface;
a second main surface;
an end face; and
a curvature part provided at least partially, wherein:
the bent glass article comprises a chemically strengthened glass; and in the first main surface or the second main surface, a fluctuation ratio obtained as a ratio of an average deviation of a depth of compressive stress layer DOL within the surface to an average value of the DOL within the surface is 3% or less.

(3) A bent glass article comprising:
a first main surface;
a second main surface;
an end face; and
a curvature part provided at least partially,
wherein a main stress difference near the end face in one of the main surfaces is 5 MPa or less.

In the present invention, it is possible to prevent a glass from being deformed by annealing and remove residual strain or residual stress from a formed bent glass article.

BRIEF DESCRIPTION OF THE DRAWINGS

FIG. 5 is an explanatory view showing a cutting step of the bent glass.

FIG. 9 is a perspective view of the fifth configuration embodiment of a support jig for supporting the bent glass.

FIG. 10A and FIG. 10B are a front view (FIG. 10A) and a side view (FIG. 10B) of the sixth configuration embodiment of a support jig for supporting the bent glass.

DETAILED DESCRIPTION OF THE INVENTION

Embodiment of the present invention will be described below in detail with reference to the drawings.

In a production method of a bent glass article in the embodiment, a sheet glass as a body to be formed is heated to at least a softening point of the sheet glass. The sheet glass softened thus is formed by a mold so that a curvature part is formed in the sheet glass. After that, heat treatment such as annealing is performed on the formed bent glass while supporting the bent glass by a support jig. Due to the annealing, the bent glass is prevented from being deformed from the formed shape, and residual strain or residual stress is removed from the bent glass.

The glass having the curvature part herein means a sheet glass including a part where the sheet glass has been partially bent, or a sheet glass in which a curved part has been formed in all or a part of the glass. In addition, the sheet glass is not limited to a flat glass, or may be a glass having some curved parts. Here, the curvature part means a part whose curvature radius is 10,000 mm or less, and a flat part means a part whose curvature radius exceeds 10,000 mm. In the following description, a body to be formed, which has not been formed yet, will be referred to as a sheet glass; a formed body which has been formed will be referred to as a bent glass; and a bent glass which has been subjected to a heat treatment step will be referred to as a bent glass article.

Figure 1:
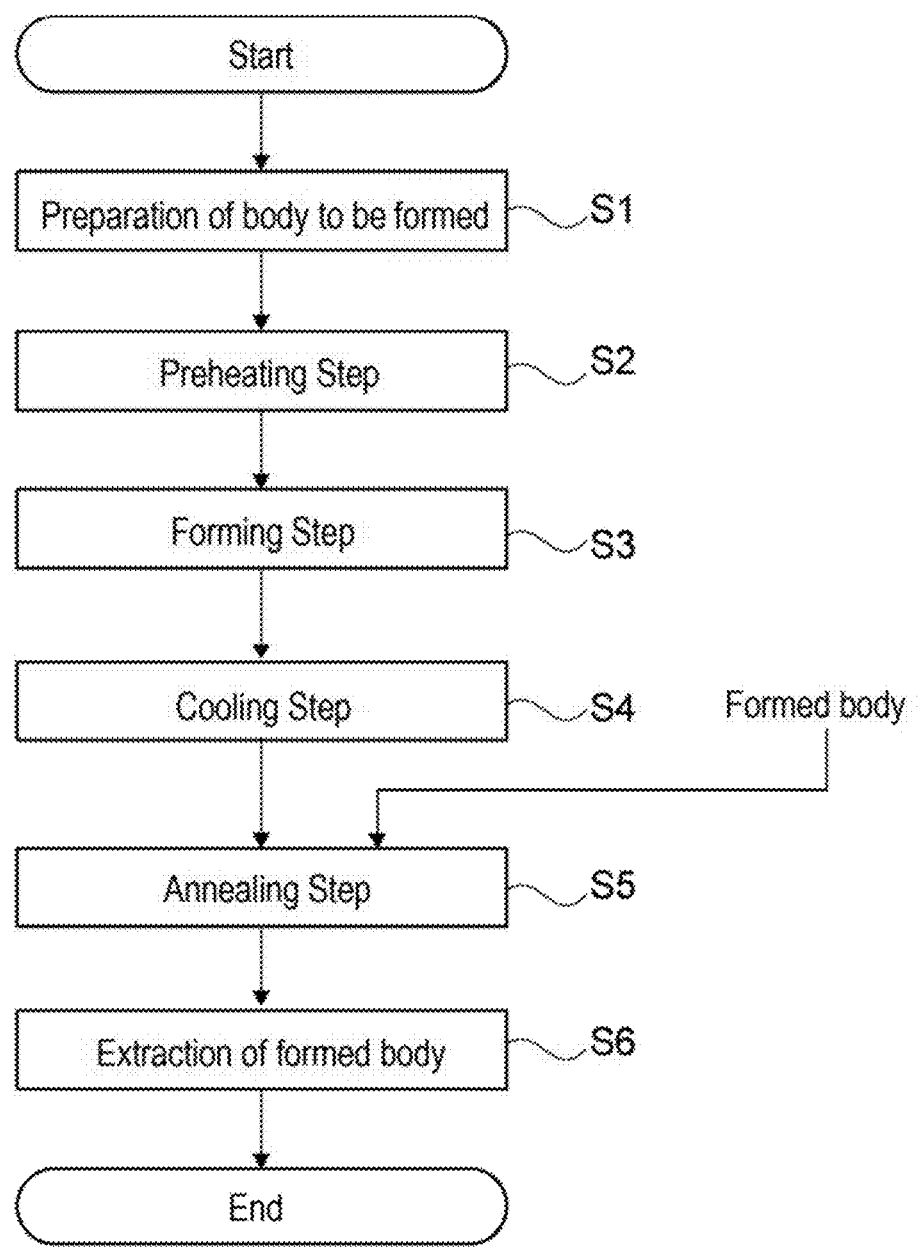
FIG. 1 is a flow chart of a schematic procedure showing an example of a production method of a bent glass article.

FIG. 1 is a flow chart of a schematic procedure showing an example of a production method of a bent glass article.

In a forming step of a bent glass, first, a sheet glass as a body to be formed is prepared, and supported by appropriate support means such as a support stand, a lower mold and an arm (S1). Next, the supported sheet glass is heated to a temperature which is not limited especially but is 300 to 600° C., for example, about 500° C. (S2). It is preferred that the sheet glass is heated to have an equilibrium viscosity of $10^{12.5}$ Pa·s or more and $10^{17}$ Pa·s or less (S2). This heating treatment serves as a preheating step of the sheet glass.

The equilibrium viscosity is measured by, e.g. beam bending method (ISO 7884-4: 1987), fiber elongation viscometer method (ISO 7884-3: 1987), parallel plate viscometer (ASTM C338-93: 2003), or sinking bar viscometer (ISO 7884-5: 1987), depending on the viscosity range to be measured. In the embodiment, the equilibrium viscosity is measured by beam bending method (ISO 7884-4: 1987).

The sheet glass which has been subjected to the preheating step is moved onto a mold, and heated to a temperature not lower than the softening point of 700 to 750° C.

The sheet glass softened by heating is gradually curved downward by its own weight. One surface (first main surface) of the sheet glass contacts a molding surface of the mold so that the shape of the molding surface can be transferred to the sheet glass. Thus, a bent glass in which a curvature part has been formed at least partially is formed (S3).

Next, the bent glass obtained by the aforementioned forming step is cooled at a cooling rate of preferably 5° C./min or more in a region where equilibrium viscosity of the bent glass is $10^{12.5}$ Pa·s or more and $10^{20}$ Pa·s or less (S4). The cooling rate is preferably 15° C./min or more. When the cooling rate falls within the range, the time for contact of the mold with the sheet glass can be shortened and the appearance defect caused by transfer from the mold can be prevented, and takt time can be shortened. The cooling rate is preferably 200° C./min or less, and more preferably 150° C./min or less. When the cooling rate falls within the range, the cracking of the sheet glass during cooling can be prevented.

It is preferred that the formed bent glass is cooled at a cooling rate as slow as possible in order to relax residual strain or residual stress. However, the cooling rate is necessary to be increased to shorten the takt time of the step. Thus, the formed bent glass is cooled at a high cooling rate. As a result, residual strain or residual stress may be generated in the cooled bent glass.

Therefore, the generated residual strain or residual stress is relaxed by a heat treatment step such as an annealing step for annealing the cooled bent glass (S5).

Figure 2:
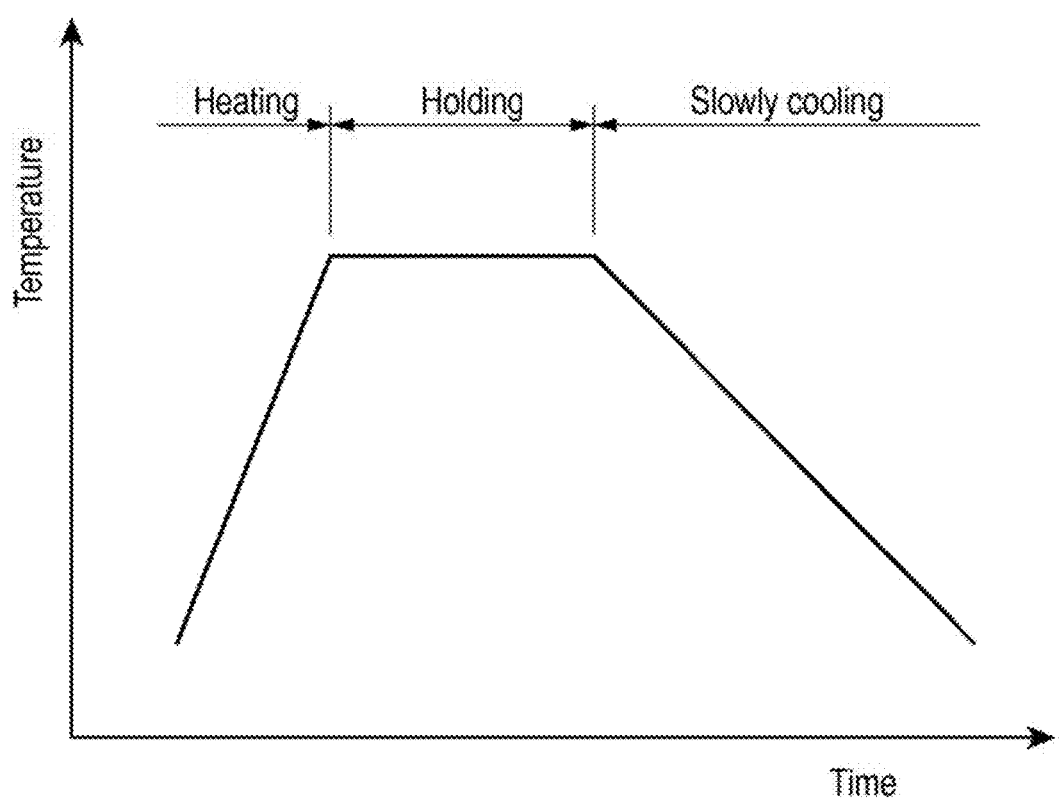
FIG. 2 is an explanatory view showing an example of a heating schedule in an annealing step.

FIG. 2 is an explanatory view showing an example of a heating schedule in the annealing step. The annealing step includes a heating step of heating the bent glass to a predetermined annealing temperature, a holding step of holding the bent glass at the annealing temperature for a predetermined time, and a gradually cooling step of cooling the bent glass at a lower rate than the heating rate.

In the heating step, it is preferred that the bent glass is heated, for example, to about 550° C. (S1) until the equilibrium viscosity of the bent glass reaches $10^{12.5}$ Pa·s to $10^{17}$ Pa·s.

In the holding step, it is preferred that the bent glass heated to the annealing temperature so that the equilibrium viscosity reaches about $10^{12.5}$ Pa·s to $10^{17}$ Pa·s is held, for example, for 10 to 180 minutes. Thus, the stress of the bent glass can be relaxed to remove its distortion by heating, so that a uniform stress distribution can be provided. Due to the uniform stress distribution, an obtained bent glass article can have a uniform spring force. For example, when the bent glass article is attached to a display panel through an adhesive, no load is applied to the adhesive, so that separation or the like can be suppressed. In some cases, the holding step may be performed with a holding temperature set to be lower than the heating temperature in the heating step.

In the gradually cooling step, it is preferred that the bent glass is cooled slowly, for example, at a temperature falling rate of 0.3 to 10° C./min until the equilibrium viscosity reaches $10^{17.8}$ Pa·s or higher. The temperature falling rate is more preferably 0.3 to 5 C./min. In this manner, it is possible to prevent a new temperature distribution from occurring in the obtained bent glass article, so that it is possible to prevent residual stress from occurring due to the temperature distribution. As a result, a good effect can be obtained.

By the aforementioned annealing step, the residual strain or the residual stress inside the bent glass is relaxed. However, the bent glass is heated to a temperature where creep deformation may occur. Thus, the shape of the formed bent glass is hardly retained. Therefore, a difference in dimension is occurred between the final dimensions of the obtained bent glass article and its design dimensions. The "creep deformation" means a phenomenon that a glass which has been heated and retained, for example, so that the equilibrium viscosity thereof reaches $10^{12.5}$ Pa·s to $10^{17}$ Pa·s is deformed in shape as time goes.

Therefore, in the embodiment, the bent glass softened during the annealing step is supported by a support jig which can support the bent glass while retaining the shape of the bent glass. By the support jig, the bent glass softened in the annealing step is supported without changing the shape. Thus, even when the bent glass is annealed, the outer shape of the bent glass can be kept so as to follow the design dimensions. In addition, the residual strain or the residual stress inside the obtained bent glass can be relaxed, and further the residual stress can be made uniform at a part including the vicinities of end faces of the bent glass. In conventional cases, a lot of defective articles are produced because desired processing cannot be performed in a subsequent step such as a chamfering step or a cutting step due to a distribution of residual stress or residual strain in a bent glass. In the embodiment, it is possible to solve the above problems. Further, when the obtained bent glass is chemically strengthened, the bent glass is strengthened uniformly within its surface, so that the bent glass can have homogenous strength.

First Configuration Embodiment of Support Jig

Figure 3:
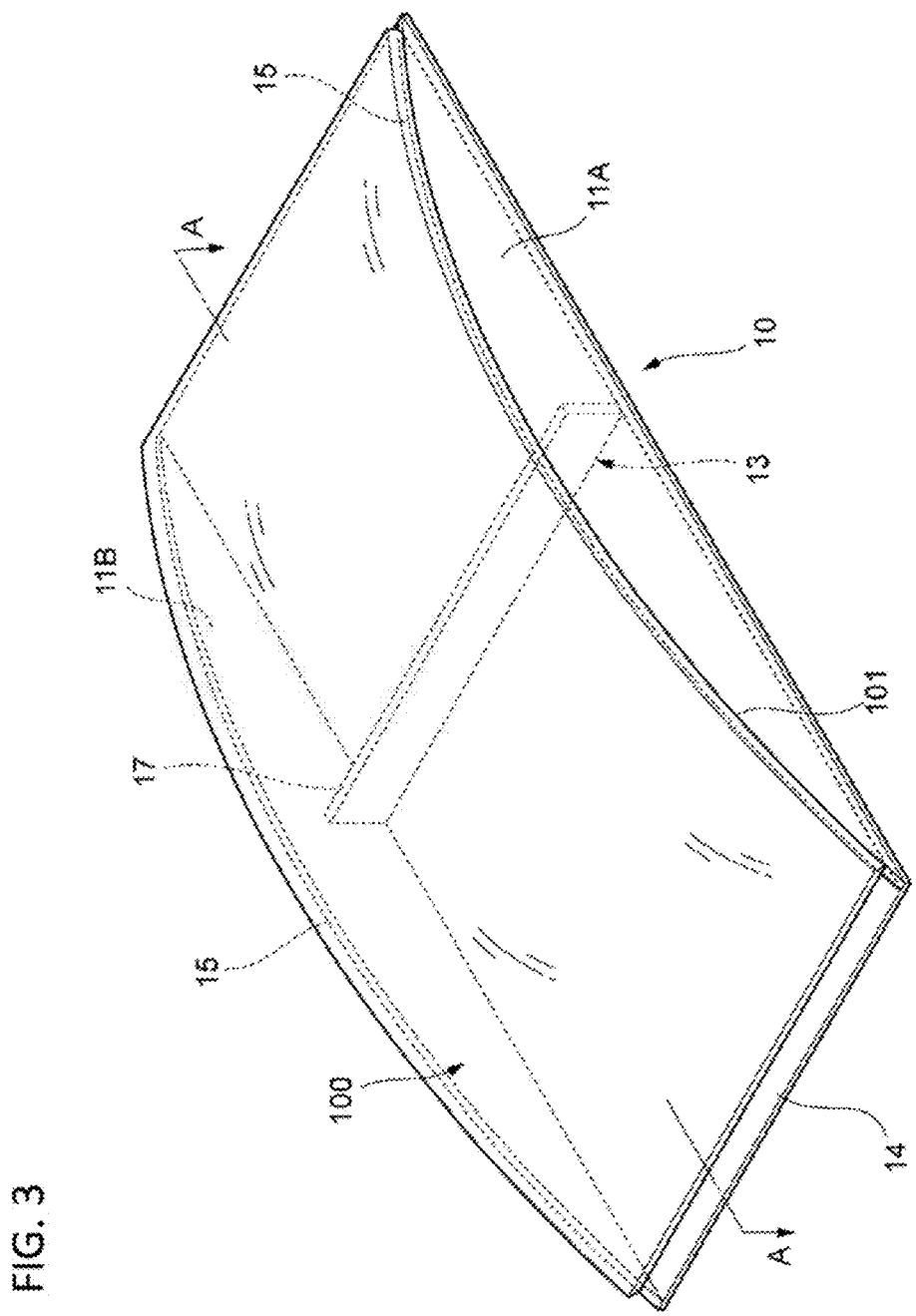
FIG. 3 is a perspective view of the first configuration embodiment of a support jig for supporting a bent glass.

FIG. 3 shows a perspective view of the first configuration embodiment of a support jig for supporting a bent glass. A bent glass 100 in the embodiment is rectangular in top view. The bent glass 100 is formed so as to be curved along its long sides. The bent glass 100 is annealed in a state where a first main surface 101 which is a lower concave surface is supported by a support jig 10. The first main surface which is a surface which has been contacted with the molding surface of the mold does not have to be supported by the support jig 10 as described above. In some situation, a second main surface may be supported.

The support jig 10 in the embodiment includes a pair of support plates 11A and 11B disposed in parallel with each other, a connection plate 13 that connects the pair of support plates 11A and 11B with each other, and a base plate 14 that fixes the support plates 11A and 11B and the connection plate 13. The connection plate 13 or the base plate 14 is not always required. However, it is preferred that at least one of the connection plate 13 and the base plate 14 is used.

In the support plates 11A and 11B, mounting surfaces 15 in their upper end parts are formed into arc shapes which extend along the long sides of the bent glass 100. The support plates 11A and 11B are provided to stand perpendicularly to the base plate 14. The mounting surfaces 15 are support surfaces by which the first main surface 101 of the bent glass 100 is supported from below at both end parts on the side of the long-side of the bent glass 100. Each mounting surface 15 has the same curved shape as the first main surface 101 of the bent glass 100. The mounting surface 15 is formed depending on the design shape of the bent glass 100. The mounting surface 15 does not have to be perfectly the same as the first main surface 101 of the bent glass 100. For example, the mounting surface 15 may have a shape approximating the design shape.

Each support plate 11A, 11B supports the first main surface 101 in a higher position than the lowest position in an end part in the long-side direction of the first main surface 101 serving as a lower surface of the bent glass 100.

Description has been made along the first main surface which is a surface which has been contacted with the molding surface of the mold. However, the same thing can be applied to the case where the second main surface is used.

When the mounting surface 15 of each support plate 11A, 11B is formed into a smooth surface having an arithmetic average roughness Ra of 1 μm or less and an arithmetic average waviness Wa of 0.7 μm or less, a fine concave-convex shape can be prevented from being transferred to the bent glass 100. When waviness is provided in the arc surface of the mounting surface 15, the contact area between the bent glass 100 and the mounting surface 15 can be reduced so that the area with which the mounting surface 15 affects the bent glass 100 can be reduced. The arithmetic average roughness Ra and arithmetic average waviness Wa are measured in accordance with JIS B0601: 2001.

The connection plate 13 is not particularly limited as long as it can connect the pair of support plates 11A and 11B with each other mechanically. It is, however, preferred that the height of an upper surface 17 of the connection plate 13 is not higher than the height of the mounting surfaces 15 of the pair of support plates 11A and 11B. It is preferred that the height of the upper surface 17 is lower than the height of the mounting surfaces 15 of the pair of support plates 11A and 11B so that the contact area between the bent glass 100 and the support jig 10 can be reduced to suppress the bent glass 100 from being injured or damaged.

In order to minimize the influence on the bent glass 100, it is preferred that the support jig 10 is formed of a heat-resistive and oxidation-resistive material such as a stainless steel material, a carbon steel material for a general structure, a low-density raw material made of carbon, SiC, fused silica, glass or ceramic, etc. In addition, a jig on which a sheet made of glass or stainless steel has been wound may be used as the support jig 10.

Figure 4A:
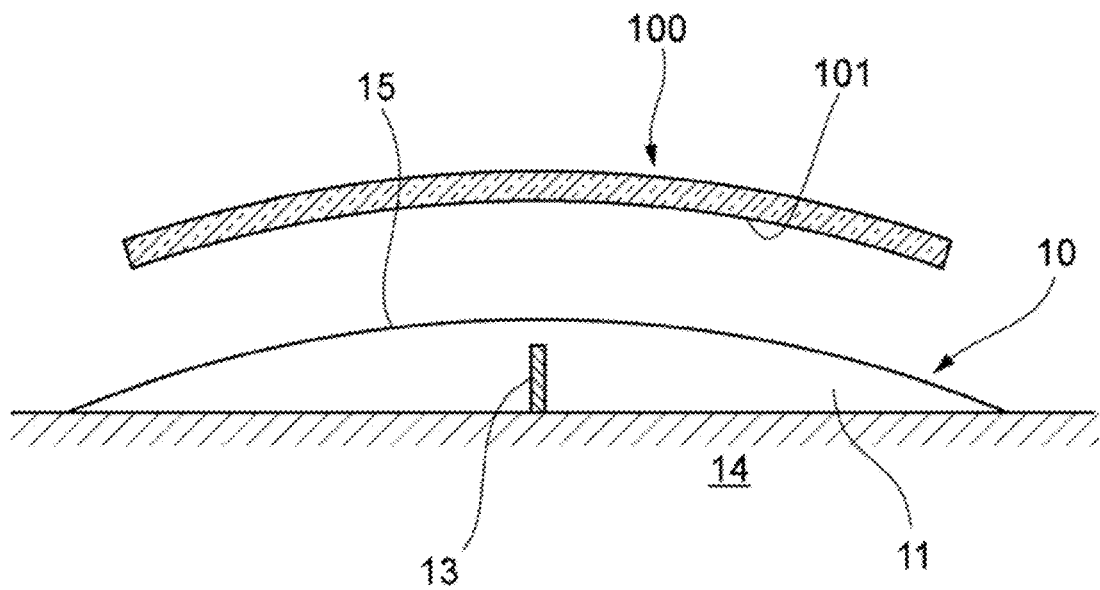
FIG. 4A and FIG. 4B are sectional views taken on line A-A in FIG. 3.
Figure 4B:
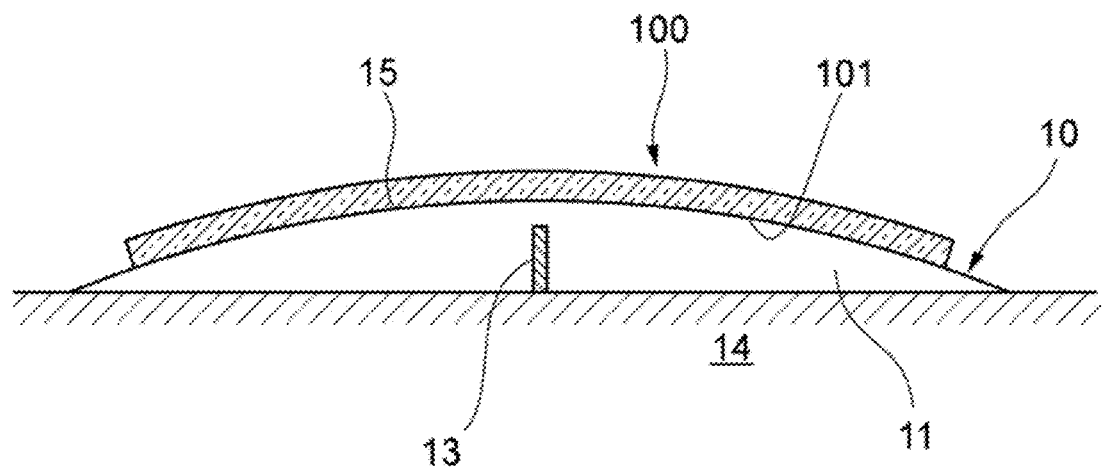

FIG. 4A and FIG. 4B are sectional views taken on line A-A in FIG. 3. The formed bent glass 100 is transported to the position above the support jig 10 before annealing as shown in FIG. 4A, and placed on the mounting surfaces 15 of the support jig 10 as shown in FIG. 4B.

For example, the aforementioned annealing step shown in FIG. 2 is performed on the bent glass 100 supported by the support jig 10. The bent glass 100 is not limited to the aforementioned bent glass which has been subjected to the preheating step, the forming step and the cooling step. A formed body prepared separately may be used as shown in S5 of FIG. 1.

The bent glass 100 is heated in the annealing step until the equilibrium viscosity thereof reaches about $10^{12.5}$ Pa·s to $10^{17}$ Pa·s. Thus, the bent glass 100 is softened and brought into a state in which the bent glass 100 can be deformed easily by its own weight. However, due to the support jig 10 in the embodiment, both end parts on the side of the long-side of the first main surface 101 of the bent glass 100 are supported by the mounting surfaces 15 of the support jig 10. Thus, deformation can be prevented, and the bent glass 100 small in distortion and high in forming accuracy can be obtained.

The annealing using the aforementioned support jig is useful particularly in an embodiment of a heat treatment apparatus in a continuous furnace system, in which high-quality bent glass articles can be continuously produced in a short takt time. As a result, the production efficiency can be improved. In addition, according to the aforementioned method for producing a bent glass article, a bent glass article small in distortion and high in forming accuracy can be obtained. In addition, a bent glass article with less damage and superior appearance can be obtained.

After the termination of the aforementioned annealing step, the bent glass 100 is removed from the support jig 10, and moved to a subsequent step.

Due to the support jig 10 in the aforementioned embodiment, contact parts between the bent glass 100 and the support jig 10 during the annealing are limited to both end parts in a short-side direction in the first main surface 101 of the bent glass 100. Accordingly, even when damages, contact marks, etc. are given to the bent glass 100 by the support jig 10, the contact parts are limited to extremely small regions of the bent glass 100. The end parts of the bent glass article after the annealing may be removed by cutting. In addition, the cut faces of the end parts of the bent glass article after the cutting may be smoothed by chamfering.

Next, mechanical processing on the bent glass 100 after the annealing step will be described.

Cutting Step

FIG. 5 shows an explanatory step view showing a step of cutting the bent glass.

In the cutting step, a part of a peripheral part 103 that is unnecessary as a product is cut off from the formed bent glass 100 or the bent glass article (hereinafter collectively referred to as a material to be processed) so as to adjust the appearance and dimensions thereof. For example, when the aforementioned contact position with the support jig 10 is removed, the cutting position is preferably at a distance of 10 mm or less from an end face of the material to be processed, and more preferably at a distance of 5 mm or less therefrom.

The material to be processed contacts the mold under a high temperature not lower than the softening point in the forming step for providing a desired curvature part. In addition, in the annealing step, end parts of the material to be processed contact the support jig 10 so that the material to be processed is supported by the support jig 10. Therefore, in the glass surface of the material to be processed, it is likely that damages, contact marks, etc. may be generated in parts which have been contacted with another member.

Accordingly, the forming step is performed using a sheet glass larger in size than the shape of a final product, and parts which have been contacted with the support jig 10 are cut off and removed with a well-known cutter or the like. Thus, the parts affected by the contact with the support jig 10 can be removed, and a bent glass article having a glass surface without any damages, any contact marks, etc can be obtained.

Chamfering Step

In chamfering by grinding, though not shown, at least a part of end faces of the material to be processed, whose appearance and dimensions have been adjusted, are chamfered. The chamfering is first performed with a rough-grained grinding stone, and then performed with a fine-grained grinding stone gradually. Thus, corner parts of each end face 105 formed by the cutting are chamfered. Alumina, cBN (cubic boron nitride), diamond, etc. may be used as the material of the rough-grained grinding stone. In terms of grindability and hardness, it is preferred that the material is diamond. The roughness of the rough-grained grinding stone is preferably #80 to #500, and more preferably #200 to #400. Alumina, cBN, diamond, etc. may be used as the material of the fine-grained grinding stone. In terms of grindability and hardness, it is preferred that the material is diamond. The roughness of the fine-grained grinding stone is preferably #300 to #3000, and more preferably #400 to #1200.

When the material to be processed is chamfered, a part to be processed is processed while coolant (water-soluble grinding liquid) is supplied thereto. A commercial product may be suitably selected and used as the coolant.

Although not shown, an opening hole may be formed in the material to be processed. In this case, it is preferred that an edge part of the opening hole is also chamfered in the same manner as the end face 105.

In addition, the aforementioned chamfering may be performed not only on the faces cut in the cutting step but also on any other end faces than the cut faces. In this case, the product shape can be finished with finer final finish dimensions.

It is preferred that both the aforementioned cutting step and the aforementioned chamfering step are performed on the bent glass article which has been subjected to the annealing step. Due to the annealing step, damages, contact marks, etc. may occur in parts the surface of the obtained bent glass article, which has been contacted with another member. When the cutting step and the chamfering step are performed, the contact marks can be removed so that the bent glass article having superior appearance can be obtained.

The process for manufacturing the bent glass article may further include a printing step of forming a printed layer on the glass surface which has been subjected to the cutting and the chamfering, or a glass strengthening step before the annealing step.

Next, description will be made about a glass material supposed to be used in the aforementioned production method of the bent glass article, the glass strengthening step and the printing step.

Glass Material of Body to be Formed

The sheet glass that is a body to be formed for use in the embodiment has a thickness of preferably 0.5 mm or more, and more preferably at 0.7 mm or more. The thickness of the glass sheet is preferably 5 mm or less, more preferably 3 mm or less, and more preferably 2 mm or less. In this range, enough strength to prevent cracking can be obtained in a final product.

As a glass composition forming the sheet glass, for example, soda lime glass, aluminosilicate glass, aluminoborosilicate glass, lithitumdisilicate glass, etc. can be used. Among them, in this embodiment, it is excellent particularly when aluminosilicate or aluminoborosilicate is used for the sheet glass. Such a sheet glass has a high Young's modulus and a high coefficient of expansion so that high thermal stress can be generated by heating of the sheet glass. As a result, the sheet glass has a large deviation from its desired bent shape. Further, when the sheet glass is strengthened, a variation in compressive stress may be occurred. When the sheet glass has such a glass composition in the embodiment, the shape deviation can be reduced in spite of the bent shape, so that the variation in compressive stress can be suppressed.

Specific examples of the glass composition include glass containing, as a composition represented by mol % on the oxide basis, from 50% to 80% of $SiO_2$, from 0.1% to 25%, of $Al_2O_3$, from 3% to 30% of $Li_2O+Na_2O+K_2O$, from 0% to 25% of MgO, from 0% to 25% of CaO, and from 0% to 5% of $ZrO_2$, but the glass composition is not limited thereto. More specifically, examples of the glass composition include the following glass compositions. Here, for example, the phrase "containing from 0% to 25% of MgO" means that MgO is not essential but may be contained up to 25%. The glass (i) is encompassed by soda lime silicate glass, and the glasses (ii) and (iii) are encompassed by aluminosilicate glass.

(i) Glass containing, as a composition represented by mol % on the oxide basis, from 63% to 73% of $SiO_2$, from 0.1% to 5.2% of $Al_2O_3$, from 10% to 16% of $Na_2O$, from 0% to 1.5% of $K_2O$, from 0% to 5% of $Li_2O$, from 5% to 13% of MgO, and from 4% to 10% of CaO.

(ii) Glass containing, as a composition represented by mol % on the oxide basis, from 50% to 74% of $SiO_2$, from 1% to 10% of $Al_2O_3$, from 6% to 14% of $Na_2O$, from 3% to 11% of $K_2O$, from 0% to 5% of $Li_2O$, from 2% to 15% of MgO, from 0% to 6% of CaO, and from 0% to 5% of $ZrO_2$, wherein the total of the contents of $SiO_2$ and $Al_2O_3$ is 75% or less, the total of the contents of $Na_2O$ and $K_2O$ is from 12% to 25%, and the total of the contents of MgO and CaO is from 7% to 15%.

(iii) Glass containing, as a composition represented by mol % on the oxide basis, from 68% to 80% of $SiO_2$, from 4% to 10% of $Al_2O_3$, from 5% to 15% of $Na_2O$, from 0% to 1% of $K_2O$, from 0% to 5% of $Li_2O$, from 4% to 15% of MgO, and from 0% to 1% of $ZrO_2$.

(iv) Glass containing, as a composition represented by mol % on the oxide basis, from 67% to 75% of $SiO_2$, from 0% to 4% of $Al_2O_3$, from 7% to 15% of $Na_2O$, from 1% to 9% of $K_2O$, from 0% to 5% of $Li_2O$, from 6% to 14% of MgO, and from 0% to 1.5% of $ZrO_2$, wherein the total of the contents of $SiO_2$ and $Al_2O_3$ is from 71% to 75%, the total of the contents of $Na_2O$ and $K_2O$ is from 12% to 20%, and in the case of containing CaO, the content thereof is less than 1%.

When colored glass is used, a coloring agent (coloring component) may be added as long as it does not inhibit the achievement of the desired chemical-strengthening properties. Suitable examples of the coloring agent include $Co_3O_4$, MnO, $MnO_2$, $Fe_2O_3$, NiO, CuO, $Cu_2O$, $Cr_2O_3$, $V_2O_5$, $Bi_2O_3$, $SeO_2$, $TiO_2$, $CeO_2$, $Er_2O_3$, $Nd_2O_3$, which have absorption in the visible region and are oxides of Co, Mn, Fe, Ni, Cu, Cr, V, Bi, Se, Ti, Ce, Er, and Nd, respectively.

When the colored glass is used as a glass base material, the glass may contain, as represented by mol percentage on the oxide basis, 7% or less of a coloring component (at least one component selected from the group consisting of oxides of Co, Mn, Fe, Ni, Cu, Cr, V, Bi, Se, Ti, Ce, Er and Nd). When the content of the coloring component exceeds 7%, the glass is likely to be unfavorably devitrified. The content of the coloring component is preferably 5% or less, more preferably 3% or less, still more preferably 1% or less. When a priority is placed on the visible light transmittance of the glass, the glass should not contain the above-described components. The glass base material may appropriately contain $SO_3$, chloride, fluoride, etc. as a fining agent during melting.

Strengthening Step

Further, a physical strengthening method or a chemical strengthening method can be used as a strengthening method for forming a surface compressive stress layer in such a sheet glass (before or after being formed into a bent shape). Glass high in mechanical strength can be obtained in the glass sheet whose glass main surface has been strengthened. In the embodiment, either strengthening method may be used, but it is preferred that strengthening is performed by a chemical strengthening method in order to obtain a glass with a small thickness and a large surface compressive stress (CS).

The chemical strengthening method is a treatment in which in molten salt just under 450° C., alkali metal ions (typically Li ions or Na ions) existing in the main surface of the sheet glass and each having a small ion radius are exchanged with alkali ions (typically Na ions or K ions for the Li ions, or K ions for the Na ions) each having a larger ion radius, so that a compressive stress layer can be formed in the glass surface. The chemical strengthening can be performed by the conventional method. Typically, glass is immersed in molten potassium nitrate salt. Up to 10 mass % of potassium carbonate may be added to the molten salt. In this manner, cracking can be removed from the surface layer of the glass, say that high-strength glass can be obtained. When a silver component such as silver nitrate is mixed into the potassium nitrate during the chemical strengthening, the glass can have silver ions in its surface due to ion exchange so that an antibacterial property can be provided. In addition, the number of chemical strengthening is not limited to once, but may be performed, for example, two or more times on different conditions.

The strengthened properties (strengthened profile) of chemically strengthened glass are generally expressed by a surface compressive stress (CS: Compressive Stress) layer formed in the surface, depth of the surface compressive stress layer (DOL: Depth Of Layer), and tensile stress formed inside the glass (CT: Central Tension). Description will be made along an example in which the sheet glass is a chemically strengthened glass.

The surface compressive stress (CS) of the compressive stress layer is preferably 500 MPa or more, more preferably 550 MPa or more, further more preferably 600 MPa or more, and especially further more preferably 700 MPa or more. As the surface compressive stress (CS) is higher, the mechanical strength of the strengthened glass is higher. On the other hand, when the surface compressive stress (CS) is too high, there is a fear that the tensile stress inside the glass may be extremely high. Therefore, the surface compressive stress (CS) is preferably 1,800 MPa or less, more preferably 1,500 MPa or less, and further more preferably 1,200 MPa or less.

In the chemical strengthening, as ion exchange advances, stress remaining in the glass is reduced due to heating during the chemical strengthening. Thus, there is a tendency that the strengthening is applied unevenly. In addition, when the residual stress is relaxed irregularly, the strengthening is also applied unevenly. Annealing is effective to solve such unevenness of the chemical strengthening. However, there is a tendency that the shape of the bent glass is changed as described above. On the other hand, in the annealing using the support jig in the embodiment, deformation of the bent glass can be suppressed, and a sufficient effect by chemical strengthening can be obtained over the glass surface. Further, a variation of DOL within the surface can be reduced by the annealing. Assuming that the ratio of an average deviation of DOL within the surface to an average value of DOL within the surface in a bent glass article is defined as a fluctuation ratio, the fluctuation ratio is 3% or lower. In this manner, an even chemically strengthened layer can be obtained, and a bent glass article having a homogenous strength can be obtained. The fluctuation ratio is more preferably 2.5% or lower.

In addition, there is a difference in Young's modulus between a bent glass article which has been annealed and a bent glass which has not been annealed (unannealed glass). There is a tendency that a deformation quantity to a load in the bent glass article is smaller than that in the unannealed bent glass. It is considered that this is caused by increase in Young's modulus. The Young's modulus is preferably 45 GPa or more, and more preferably 50 GPa or more. When the bent glass article is attached as a cover glass to a curved-surface display panel, deformation can be suppressed even when a load is applied to the glass by pressing or the like. Thus, the shape accuracy of the glass can be retained. Further, the bent glass article may be used as a final product such as a display device. Even when the glass is pressed in such a case due to operation on a touch panel, deformation of the glass can be reduced as the Young's modulus is higher. Thus, it is considered that unintentional glass deformation can be reduced, and touch feeling is superior. The Young's modulus is preferably 90 GPa or less, and more preferably 85 GPa or less. When the Young's modulus exceeds such an upper limit, the glass itself may be easily broken. The Young's modulus is measured by a method stipulated in JIS R1659: 2003.

The depth of the surface compressive stress layer (DOL) formed in the main surface of the glass is preferably 5 μm or more, more preferably 8 μm or more, and further more preferably 10 μm or more. On the other hand, when the DOL is too large, there is a fear that the tensile stress inside the glass may be increased extremely. Thus, the depth of the compressive stress layer (DOL) is preferably 150 μm or less, more preferably 100 μm or less, further more preferably 80 μm or less, and typically 50 μm or less.

The surface compressive stress (CS) formed in the main surface of the glass and the depth of the surface compressive stress layer (DOL) can be obtained from the number of interference fringes and intervals thereof observed by a surface stress meter (FSM-6000, made by ORIHARA Industrial Co., Ltd.). For example, a light source with a wavelength of 589 nm or 790 nm can be used as a measuring light source for FSM-6000. The surface compressive stress may be measured using birefringence. When optical evaluation is difficult, estimation can be made using mechanical strength evaluation of three-point bending or the like. The tensile stress (CT: unit MPa) formed inside the glass can be calculated by the following expression using the aforementioned measured surface compressive stress (CS: unit MPa) and the aforementioned measured depth of the surface compressive stress layer (DOL: unit μm).

$$CT=\{CS\times(DOL\times10^{-3})\}/\{t-2\times(DOL\times10^{-3})\}$$

Here, t (unit: mm) designates the sheet thickness of the glass.

In addition, it is preferred that the chemically strengthened glass in the embodiment contains, in its surface, at least one kind selected from the group consisting of sodium ions, silver ions, potassium ions, cesium ions and rubidium ions. In this manner, compressive stress can be induced in the surface to strengthen the glass highly. In addition, when silver nitrate is mixed into potassium nitrate during the chemical strengthening, the formed body of the glass can have silver ions in its surface due to ion exchange so that an antibacterial property can be provided.

A step of cleansing the bent glass article may be performed after the strengthening step is performed. As the cleansing step, for example, acid treatment, alkaline treatment, or alkaline brush washing may be performed in addition to water washing. In addition, the strengthening step may be performed not once but two or more times.

Printed Layer

A printed layer may be formed by various kinds of printing methods and inks (printing material) depending on applications thereof. As the printing methods, examples thereof include spray printing, ink jet printing, and screen printing. By these methods, good printing can be conducted even on a glass which has a large area. In particular, by use of the spray printing, printing is easily performed on a bent glass article which has a curvature part, and the surface roughness of a printed surface is easily controlled. On the other hand, by use of the screen printing, a desired print pattern is easily formed so as to have uniform average thickness in a bent glass article which has a large flat part. In addition, a plurality of inks may be used. From the standpoint of adhesiveness of a printed layer, it is preferred that one kind of ink is used.

The ink for forming the printed layer may be inorganic or organic. Examples of compositions of the inorganic ink include a composition including at least one kind selected from $SiO_2$, ZnO, $B_2O_3$; $Bi_2O_3$, $Li_2O$, $Na_2O$ and $K_2O$, a composition including at least one kind selected from CuO, $Al_2O_3$, $ZrO_2$, $SnO_2$ and $CeO_2$, a composition including $Fe_2O_3$, and a composition including $TiO_2$.

Various printing materials in which resin has been dissolved in a solvent can be used as the organic ink. For example, at least one kind selected from the group consisting of acrylic resin, urethane resin, epoxy resin, polyester resin, polyamide resin, vinyl acetate resin, phenolic resin, olefin, ethylene-polyvinyl acetate copolymer resin, polyvinyl acetal resin, natural rubber, styrene-butadiene copolymer, acrylonitrile-butadiene copolymer, polyester polyol, polyether polyurethane polyol, etc. may be used as the resin. In addition, water, alcohols, esters, ketones, aromatic hydrocarbon based solvents, or aliphatic hydrocarbon based solvents may be used as the solvent. Examples of the alcohols include isopropyl alcohol, methanol, ethanol, etc. Examples of the esters include ethyl acetate. Examples of the ketones include methyl ethyl ketone. Examples of the aromatic hydrocarbon based solvents include toluene, xylene, Solvesso 100 and Solvesso 150, manufactured by ExxonMobil Corporation, etc. Examples of the aliphatic hydrocarbon based solvents include hexane. These examples are listed by way of example. Other various printing materials can be used. The aforementioned organic printing materials are applied onto a transparent sheet, and the solvent is then evaporated, and a printed layer is obtained out of a layer of resin formed thus.

A coloring agent may be contained in the ink used for the printed layer. For example, when the printed layer is colored in black, a black coloring agent such as carbon black may be used as the coloring agent. Other appropriate coloring agents can be used depending on desired colors.

In the embodiment, the printed layer may be formed in a contact position between the bent glass 100 and the support jig 10. In this case, even when damages, contact marks, etc. occur in the surface of the bent glass 100, the printed layer is formed in that part where the damages, the contact marks, etc. occur. Thus, the damages, the contact marks, etc. cannot be visually recognized even if they occur.

Next, description will be made about other configuration embodiments of support jigs for supporting a bent glass in the annealing step.

Second Configuration Embodiment of Support Jig

Figure 6:
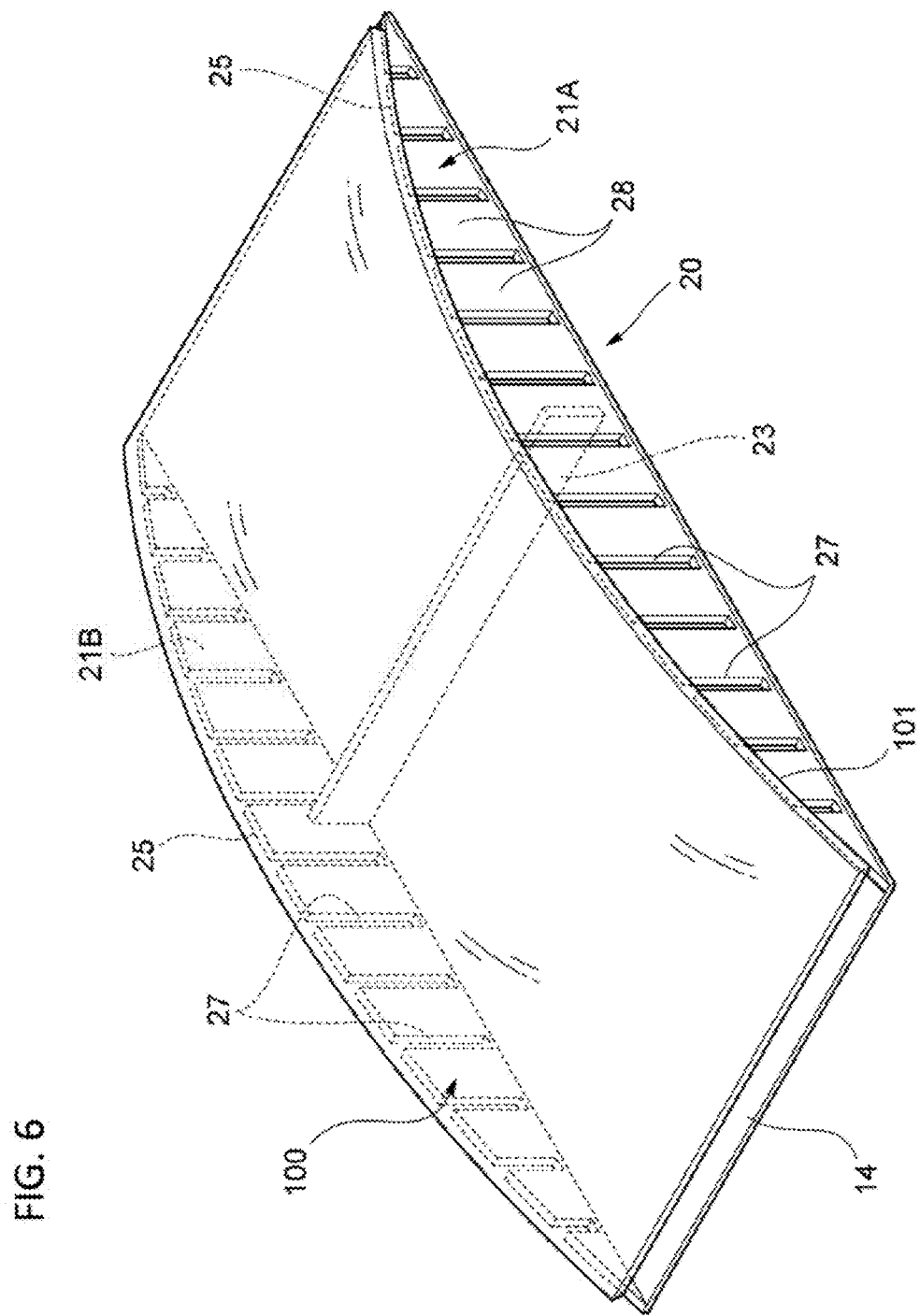
FIG. 6 is a perspective view of the second configuration embodiment of a support jig for supporting the bent glass.

FIG. 6 is a perspective view of the second configuration embodiment of a support jig for supporting a bent glass. In the following description, members or parts that can be shared will be referenced correspondingly to each other, and description thereof will be omitted or simplified.

A support jig 20 in the embodiment includes a pair of support plates 21A and 21B disposed in parallel with each other, a connection plate 23 that connects the pair of support plates 21A and 21B with each other, and a base plate 14 that fixes the support plates 21A and 21B and the connection plate 23.

In the support plates 21A and 21B, mounting surfaces 25 in their upper end parts are formed into arc shapes. The support plates 21A and 21B are provided to stand perpendicularly to the base plate 14. By the mounting surfaces 25, the first main surface 101 of the bent glass 100 are supported from below at both end parts on the side of the long-side of the bent glass 100. Each mounting surface 25 has the same curved shape as the first main surface 101 of the bent glass 100. The mounting surface 25 is formed depending on the design shape of the bent glass 100. The mounting surface 15 may have a shape approximating the design shape.

Each support plate 21A, 21B supports the first main surface 101 in a higher position than the lowest position in an end part in the long side direction of the first main surface 101 serving as a first main surface of the bent glass 100, in the same manner as in the first configuration embodiment.

Each of the pair of support plates 21A and 21B in the embodiment is formed into a comb-like shape, in which a plurality of slits 27 are formed vertically from the mounting surface 25 side, and a plurality of support pieces 28 are provided erectly. Accordingly, the mounting surface 25 of the support plate 21A, 21B is divided into a plurality of regions by the support pieces 28 so as to reduce the contact area with the bent glass 100 correspondingly to the area of the slits 27. Thus, the contact area between the bent glass 100 and the support plate 21A, 21B is smaller than that in the support jig 10 in the first configuration embodiment. As a result, the influence of the mounting surface 25 on the bent glass 100 can be further reduced. In addition, when the heights of the support pieces 28 are adjusted suitably, various shapes of bent glasses 100 can be flexibly dealt with at a low cost. Further, the support plate 21A, 21B may be formed by a combination of support pieces 28 adjusted in advance as to their heights or the like. The other configuration and operation are same as those of the support jig 10 in the first configuration embodiment.

Third Configuration Embodiment of Support Jig

Figure 7:
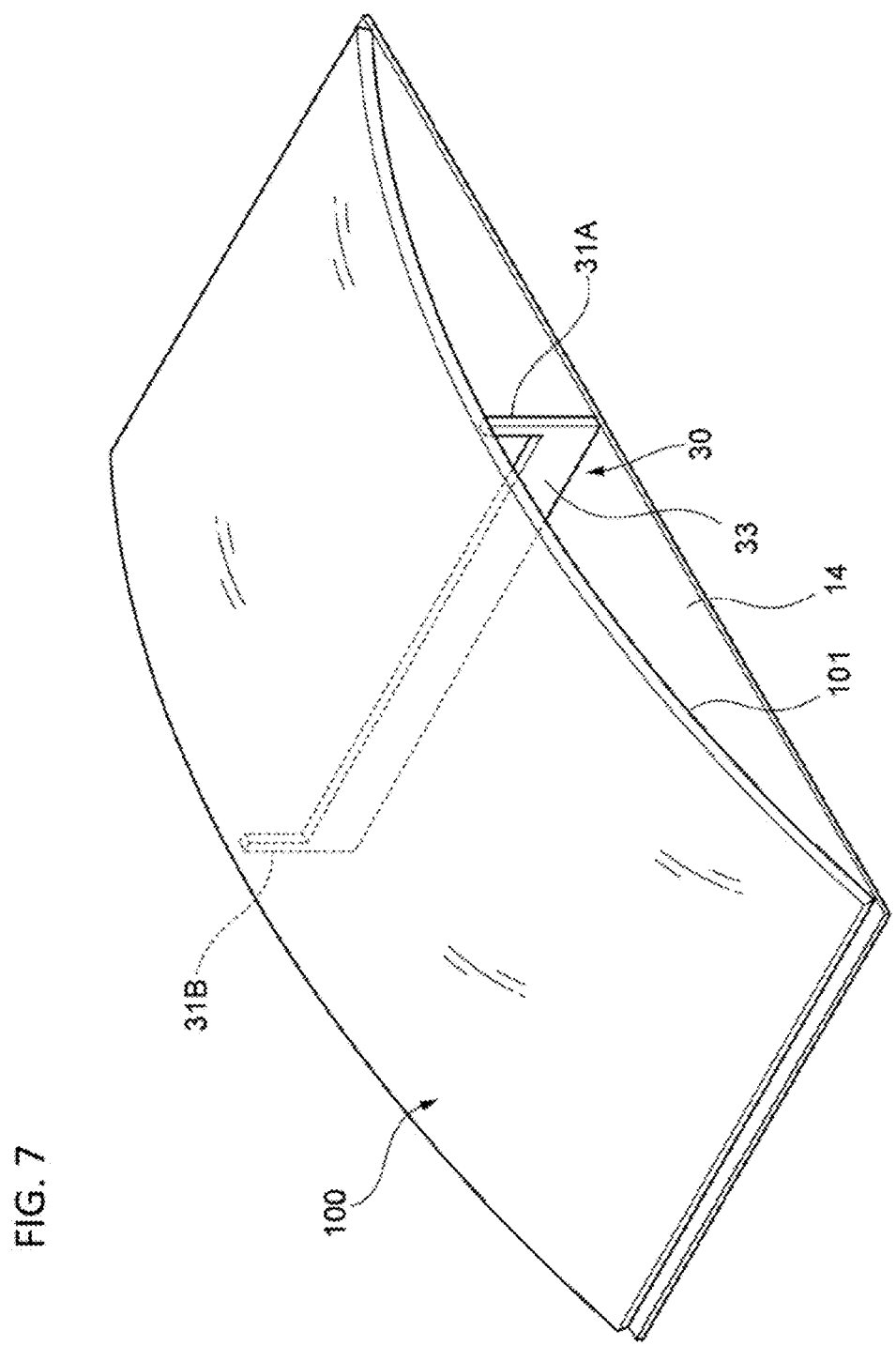
FIG. 7 is a perspective view of the third configuration embodiment of a support jig for supporting the bent glass.

FIG. 7 is a perspective view of the third configuration embodiment of a support jig for supporting a bent glass.

A support jig 30 in the configuration embodiment includes a connection plate 33 including a pair of support pins 31A and 31B for supporting the first main surface 101 of the bent glass 100 from below, and a base plate 14 that fixes the connection plate 33. The base plate 14 may be shortened or omitted as long as the connection plate 33 can be fixed erectly.

By the support pins 31A and 31B, an intermediate part of the bent glass 100 in its long-side direction is supported at both end parts in its short-side direction. That is, each of the pair of support pins 31A and 31B supports the bent glass 100 in a higher position than an end part in the long-side direction corresponding to the lowest position of the first main surface 101 of the bent glass 100.

When the heights of the support pins 31A and 31B are adjusted, the support jig 30 in the embodiment can support the bent glass 100 so as to follow its bent shape.

The end parts in the long-side direction of the bent glass 100 are set in light contact with the base plate 14 or another member. When the end parts in the long-side direction is contacted with the base plate 14, the posture with which the bent glass 100 is supported can be retained stably.

According to the support jig 30 configured thus by two-point support, the bent glass 100 can be supported by a simple configuration even when the bent glass 100 has a comparatively large size as long as the bent glass 100 has a simple shape such as a cylindrical shape. In addition, according to the support jig 30, the contact area with the first main surface 101 of the bent glass 100 is further smaller than that in the first or second configuration embodiment, so that the occurrence of damages, contact marks, etc. in the glass surface can be reduced. In addition, the configuration of the support jig 30 can be simplified and the cost suppressing effect can be enhanced. The other configuration and operation are same as those of the support jig 10 in the first configuration embodiment.

Fourth Configuration Embodiment of Support Jig

Figure 8:
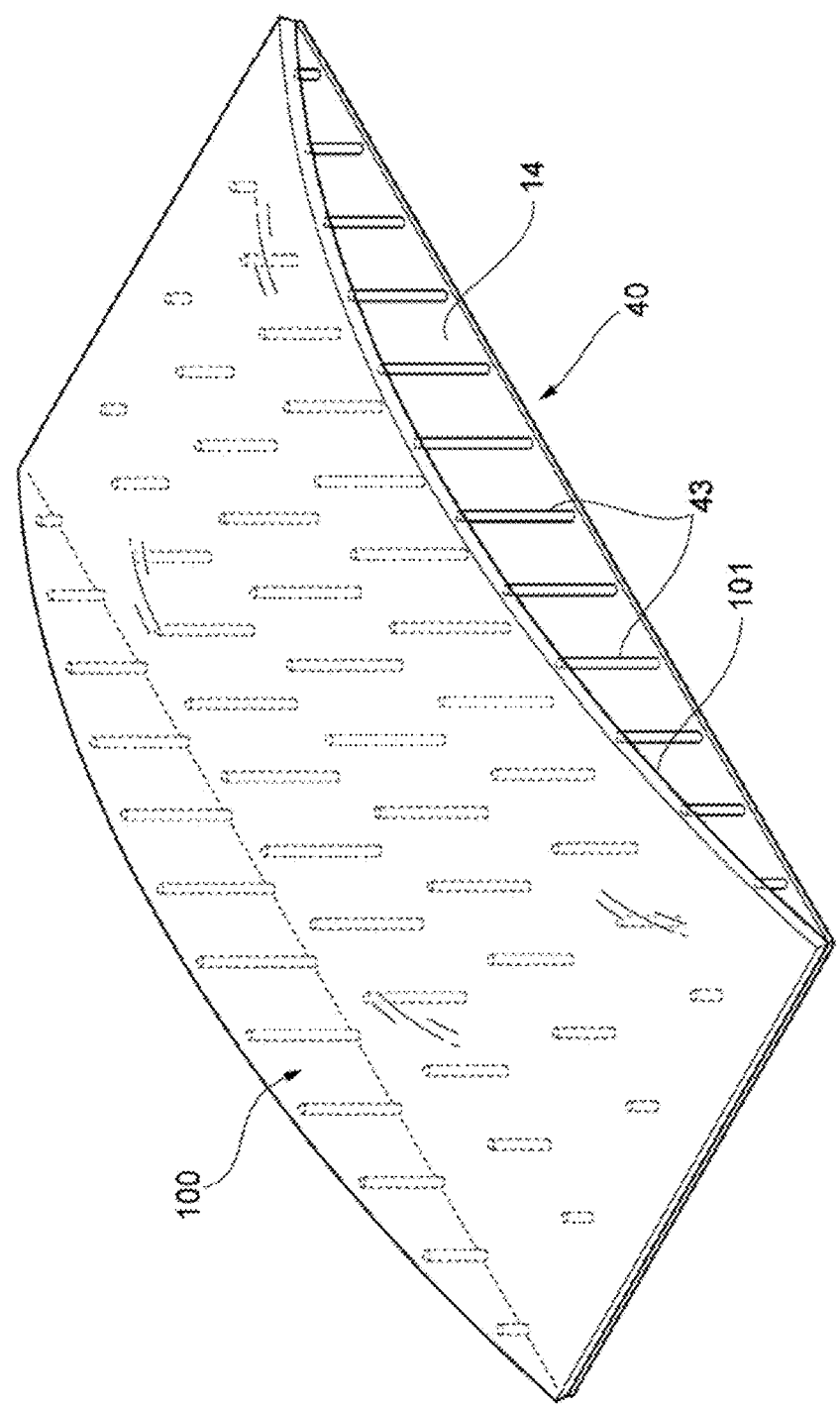
FIG. 8 is a perspective view of the fourth configuration embodiment of a support jig for supporting the bent glass.

FIG. 8 is a perspective view of the fourth configuration embodiment of a support jig for supporting a bent glass.

A support jig 40 in the configuration embodiment includes a base plate 14, and a plurality of pins 43 provided erectly on the base plate 14. The lengths of the pins 43 are adjusted to different lengths so as to follow the shape of the first main surface 101 of the bent glass 100 respectively. That is, the heights of the pins 43 are adjusted to support the curved surface shape of the bent glass 100 in different positions respectively.

In the support jig 40 in the embodiment, when the lengths of the plurality of pins 43 are adjusted, the front ends of the pins 43 can follow the three-dimensional curved shape of the bent glass 100 easily. Even when the bent shape of the bent glass 100 is a complicated shape such as a double-curved shape curved in a plurality of different directions or a shape having concave-convex structures, the formed shape of the bent glass 100 can be supported stably as it is only if the lengths of the pins 43 are adjusted simply.

Fifth Configuration Embodiment of Support Jig

FIG. 9 is a perspective view of the fifth configuration embodiment of a support jig for supporting a bent glass.

A support jig 50 in the configuration embodiment includes a mounting surface 51 having a shape following the shape of the first main surface 101 of the bent glass 100. The mounting surface 51 of the bent glass 100 is a concave-convex surface in which very small dotted or linear convex parts have been formed. The bent glass 100 is supported by point contact or line contact on the mounting surface 51 formed as the concave-convex surface.

The concave-convex surface shape of the mounting surface 51 is not limited to the aforementioned aspect. Very small dotted convex parts and very small linear convex parts may be mixed in the concave-convex surface shape. In addition, the maximum interval between adjacent ones of the very small convex parts is preferably 2 to 50 mm, and more preferably 5 to 15 mm. As the maximum interval is narrower, the bent glass 100 can be supported more stably. However, when the maximum interval is too narrow, there is a fear that the contact area increases and damages or marks are generated. In addition, as the maximum interval is wider, the occurrence of damages or marks can be suppressed. However, when the maximum interval is too wide, it is difficult to support the bent glass 100 while retaining the shape thereof. It is therefore preferable that the maximum interval is set in the aforementioned range.

In the support jig 50 in the embodiment, the whole surface of the first main surface 101 of the bent glass 100 is supported by point contact or line contact with the mounting surface 51. It is therefore possible to increase the arrangement density of support points of the bent glass 100 while suppressing increase in contact area. Thus, even when the bent glass 100 is softened, the bent glass 100 can be always supported stably by the support jig 50 without being deformed by its own weight. In addition, in the support jig 50 in the embodiment, grooves capable of mounting the bent glass 100 thereabove may be formed in the mounting surface 51, or abutment pieces capable of supporting end faces of the bent glass 100 may be formed.

Sixth Configuration Embodiment of Support Jig

FIG. 10A and FIG. 10B are a front view (FIG. 10A) and a side view (FIG. 10B) of the sixth configuration embodiment of a support jig for supporting a bent glass.

A support jig 60 in the configuration embodiment supports the bent glass 100 which is inclined and laid against the support jig 60. The support jig 60 includes a base plate 61, a support pin 63 provided erectly on the base plate 61, a support portion 65 provided at the front end of the support pin 63 and having a support surface for supporting the bent glass 100, and a fixation member 67. The fixation member 67 is fixed to the base plate 61 so that a lower end 100a of the bent glass 100 is locked to the fixation member 67. The bent glass 100 is not limited to the aforementioned shape with the curved long sides. The bent glass 100 may have a shape with curved short sides as shown in FIG. 10.

The bent glass 100 is placed on the base plate 61 with the concave-shaped first main surface 101 facing downward. An intermediate part in the height direction, which is higher than the lowest position P1 of the first main surface 101, is in contact with the support portion 65. The lower end 100a of the bent glass 100 is prevented from falling down by the fixation member 67. In this manner, the bent glass 100 is supported by the support jig 60 in a state where the bent glass 100 is in contact with the fixation member 67 and the support portion 65.

In the support jig 60 in the embodiment, the bent glass 100 laid against the support jig 60 is supported. Thus, the area of the bent glass 100 occupying a horizontal plane can be reduced. Thus, when a large number of bent glasses are annealed at one time, the space efficiency can be improved so that equipment including a heating device and so on can be miniaturized.

Seventh Configuration Embodiment of Support Jig

Figure 11A:
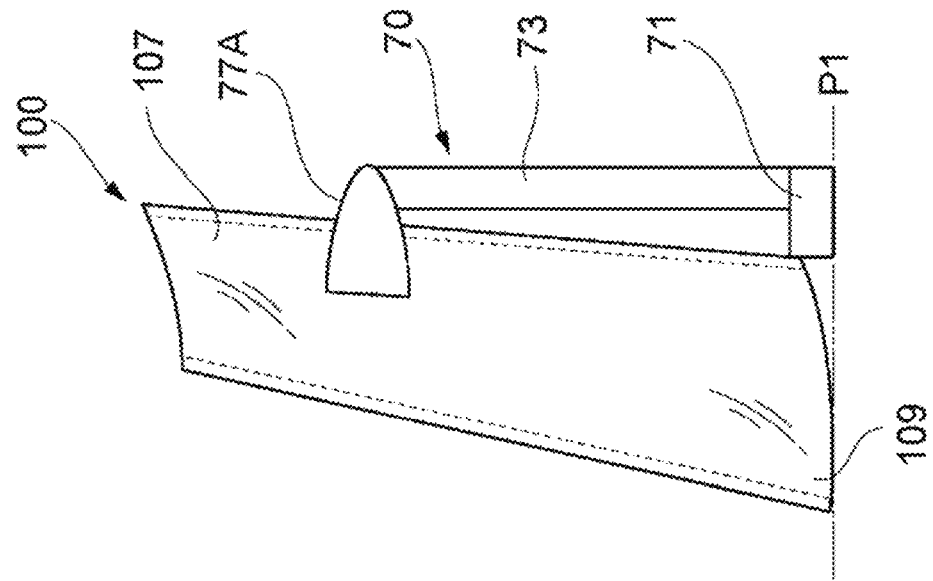
FIG. 11A and FIG. 11B are a front (FIG. 11A) and a side view (FIG. 11B) of the seventh configuration embodiment of a support jig for supporting the bent glass.
Figure 11B:
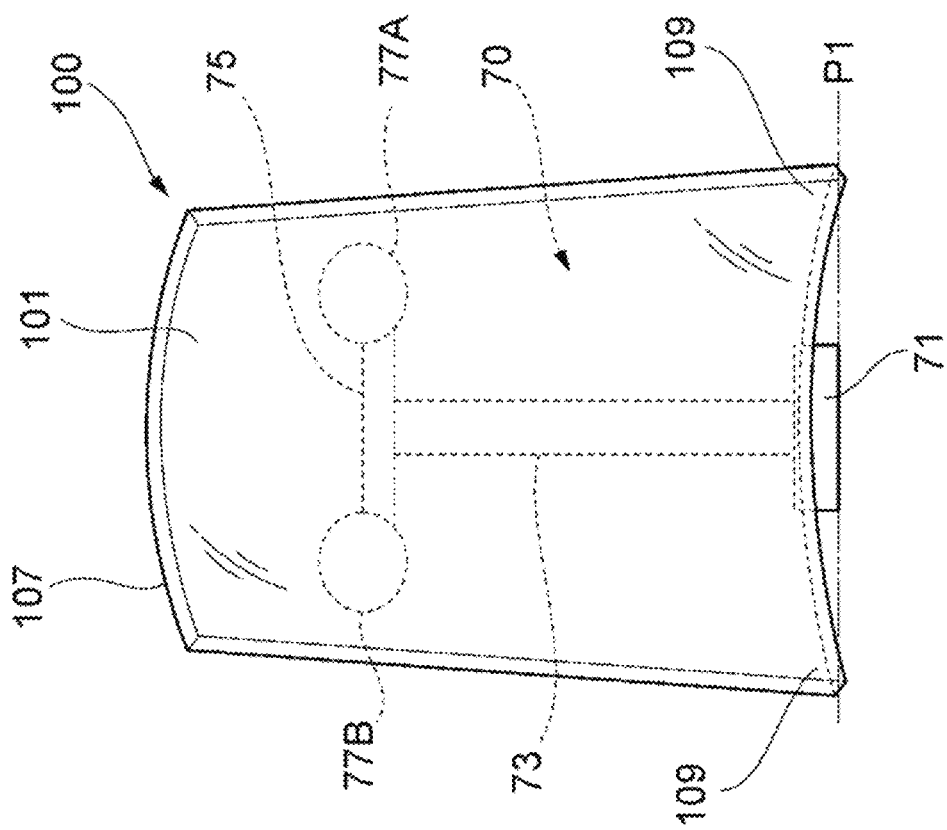

FIG. 11A and FIG. 11B are a front view (FIG. 11A) and a side view (FIG. 11B) of the seventh configuration embodiment of a support jig for supporting a bent glass.

A support jig 70 in the configuration embodiment supports the bent glass 100 which is inclined and laid against the support jig 70, in the same manner as the support jig 60 in the sixth configuration embodiment. The support jig 70 includes a base plate 71, a support pin 73 provided erectly on the base plate 71, an arm member 75 provided at the front end of the support pin 73 and extended horizontally, and a pair of support portions 77A and 77B provided at both ends of the arm member 75 and having support surfaces for supporting the bent glass 100.

The bent glass 100 is supported on the support jig 70 with a second main surface 107 facing downward. The second main surface 107 is on the back side of the concave-shaped first main surface 101. The pair of support portions 77A and 77B is in contact with an intermediate part in the height direction, which is higher than the lowest position P1 of the second main surface 107. In this manner, the bent glass 100 is supported in a state where the bent glass 100 is laid against the support jig 70.

In the support jig 70 in the embodiment, the convex second main surface 107 is supported by the pair of support portions 77A and 77B so that the bent glass 100 can be laid against the support jig 70 stably.

As described above, the support jigs shown in the respective configuration embodiment can be applied to annealing for bent glasses having complicated shapes or bent glasses required to have precise shapes following design dimensions.

In the bent glass obtained in the present invention, residual strain or residual stress inside the bent glass can be relaxed, and further the residual stress can be made uniform in the bent glass including the vicinities of end faces of the bent glass. When the bent glass is finally used as a cover glass of an in-vehicle display device or the like, the vicinities of the end faces of the bent glass are fixed to a housing or the like by use of an adhesive or the like. In an in-vehicle temperature environment where the in-vehicle display device is placed, the adhesive may expand or contract, or the bent glass itself may expand or contract. Thus, an irregular external force may be applied to an end face of the bent glass. It is assumed that the end face of the bent glass may be damaged by the irregular external force. In the glass obtained in the present invention, residual stress is relaxed even in the vicinities of the end faces of the glass, and also made uniform. Thus, it is possible to obtain a high-quality bent glass high in strength and homogenous.

In addition, in conventional cases, a lot of defective articles are produced because desired processing cannot be performed in a subsequent step such as a chamfering step or a cutting step since a bent glass is easy to be damaged due to a distribution of residual stress or residual strain in the bent glass. In the bent glass of the embodiments, it is possible to solve the above problems. In addition, there have been the following problems: in a glass having residual stress, the residual stress is affected by compressive stress generated during chemical strengthening, so that the chemical strengthening cannot be applied easily; or the shape of the bent glass is deformed. However, when the bent glass obtained in the present invention is chemically strengthened, the shape deformation can be suppressed, and the bent glass can be strengthened uniformly within the surface thereof, so that the strength of the bent glass can be made homogenous.

Residual stress of a bent glass can be evaluated by an index "main stress difference $\Sigma$". At any point within the bent glass surface, the main stress difference $\Sigma$ is preferably 7 MPa or less, more preferably 5 MPa or less, and further more preferably 3 MPa or less. The main stress difference $\Sigma$ can be made low and set on the same level in both the vicinities of the end faces of the bent glass and the other parts of the bent glass. Thus, through the cutting step, the chamfering step, the chemically strengthening step, etc., a high-quality bent glass can be obtained at high efficiency. The tower limit of the main stress difference $\Sigma$ in the bent glass is not limited especially. The phrase "vicinities of the end faces of the bent glass" designates endless belt-like regions ranging from the respective end faces to some extent. For example, the regions are set as regions each having a width of 10 mm or less.

In addition, when the main stress difference $\Sigma$ is equal to or less than the upper limit or the same level in the vicinities of the end faces and the bent part, the distortion in shape is reduced to give the bend glass having more homogeneous strength by the chemical strengthening treatment of the post-process.

The "main stress difference $\Sigma$" can be obtained as follows. A phase difference $\phi$ is measured at arbitrary points in a main surface of a material to be measured such as a bent glass. The phase difference $\phi$ is divided by a photoelastic coefficient E of the material to be measured. Thus, the main stress difference $\Sigma$ can be obtained. The obtained main stress difference $\Sigma$ means an absolute value of a difference between an integral value $\int \sigma_{max} dt$ of a maximum main stress $\sigma_{max}$ at the measuring points in a direction of thickness t of the material to be measured, and an integral value $\int \sigma_{min} dt$ of a minimum main stress likewise. The main stress difference $\Sigma$ indicates a stress distribution at the arbitrary points. The phase difference $\phi$ can be measured, for example, by a wide range birefringence analysis system (model number WPA-100) manufactured by Photonic Lattice, Inc., and can be calculated using bundled software WPA-view.

The present invention is not limited to the aforementioned embodiments. It is noted that combinations of constituents of the embodiments with one another or modifications and applications made by those in the art based on the description of the present specification and well-known technologies are also intended by the present invention and encompassed by the scope of protection required therein.

In the bent glass in each illustrated embodiment, the sheet surface has a curved shape with a single curvature radius as a whole. The bent glass is not limited thereto, but may have a shape in which a curvature part lies at least partially.

The curvature radius of the curvature part is preferably 5,000 mm or less, more preferably 4,000 mm or less, further more preferably 2,000 mm or less, and especially further more preferably 1,000 mm or less. The bent glass in the embodiment(s) is suitable to a bent glass with a curvature part having a small curvature radius and requiring higher dimensional accuracy. The curvature radius of the curvature part is preferably 1 mm or more, more preferably 5 mm or more, and further more preferably 10 mm or more. When the curvature radius is equal to or more than the lower limit, protrusion of the curvature of the bent glass attached to a final product such as an in-vehicle display device is so gentle that impact resistance can be ensured. In addition, when the curvature radius is equal to or less than the upper limit, visibility of a display can be ensured.

The bending depth of the curvature part is preferably 5 mm or more, more preferably 10 mm or more, further more preferably 20 mm or more, and especially further more preferably 30 mm or more. The bent glass in the embodiment(s) is suitable to a bent glass with a curvature part having a large bending depth and requiring higher dimensional accuracy. The bending depth of the curvature part is preferably 1,000 mm or less, more preferably 800 mm or less, further more preferably 500 mm or less, and especially further more preferably 200 mm or less. When the bending depth is equal to or more than the upper limit, protrusion of the curvature of the bent glass attached to a final product such as an in-vehicle display device is so gentle that impact resistance can be ensured. In addition, when the bending depth is equal to or less than the upper limit, visibility of a display can be ensured.

Here, the bending depth designates a distance between a line segment connecting two lower end portions and, a tangential line in contact with the curvature part of straight lines parallel to the line segment, in a sectional view in a thickness direction of a base material including the curvature part.

Assuming that an angle formed by tangential lines in the respective both end portions forming the curvature part and an intersection point formed by the tangential lines in the sectional view in the thickness direction of the bent glass is defined as "opening angle", the opening angle is preferably 45° or more and 315° or less, and more preferably 90° or more and 270° or less.

The bent glass may have a "twisted structure". The word "twisted" means a shape obtained under the conditions in which the curvature radius in the curvature part does not have to be fixed, and the opening angle does not have to be fixed. In the present invention, even when a bent glass has a complicated shape like a twisted structure, the bent glass can be annealed with good dimensional accuracy. Thus, residual stress or the like can be removed. It is therefore possible to obtain a bent glass with a complicated shape high in dimensional accuracy and easy to be chemically strengthened.

As forming processes which can used in the forming step of forming a sheet glass as a body to be formed to thereby obtain a bent glass, examples thereof include a differential pressure forming process such as a vacuum forming process or a compressed air forming process, a gravity forming process, a press forming process, etc. A desired forming process may be selected depending on a glass shape to be formed. In addition, a process for bending a part of glass by local heating can be selected as to the aforementioned process.

The differential pressure forming process is a process in which differential pressure is applied to the front and back surfaces of a sheet glass which has been softened, and the sheet glass is bent following a mold, and formed into a predetermined shape.

In the vacuum forming process, a sheet glass is placed on a predetermined mold following the shape of a bent glass which should be obtained after forming, and a cramp die is placed on the sheet glass and the periphery of the sheet glass is sealed. After that, a space between the mold and the sheet glass is decompressed by a pump to apply differential pressure to the front and back surfaces of the sheet glass to thereby form the sheet glass into the predetermined shape.

In the compressed air forming process, a sheet glass is placed on a predetermined mold following the shape of a bent glass which should be obtained after forming, and a cramp die is placed on the sheet glass and the periphery of the sheet glass is sealed. After that, pressure is applied to the upper surface of the sheet glass by compressed air to apply differential pressure to the front and back surfaces of the sheet glass to thereby form the sheet glass into the predetermined shape.

The vacuum forming process and the compressed air forming process may be combined with each other.

The gravity forming process is a process in which a sheet glass is placed on a predetermined mold following the shape of a bent glass which should be obtained after forming, the sheet glass is then heated and softened, and the sheet glass is bent by gravity to follow the mold to be thereby formed into a predetermined shape.

In the press forming process, a sheet glass is placed between predetermined molds (an upper mold and a lower mold) following the shape of a bent glass which should be obtained after forming, and the sheet glass is softened. In this state, a press load is applied to the upper and lower molds so that the sheet glass can be bent following the molds to be thereby formed into a predetermined shape.

Of the aforementioned forming processes, the differential pressure forming process and the gravity forming process are preferred particularly as the method for obtaining a bent glass. According to the differential pressure forming process, the bent glass can be formed without bringing the second main surface of the first and second main surfaces of the bent glass into contact with the mold. It is therefore possible to reduce concave/convex defects such as damages or dents. Accordingly, in terms of improvement in visibility, it is preferred that the second main surface is used as an outside surface of an assembly, that is, a surface to be touched by a user in a normal use state.

Of the aforementioned forming processes, two or more kinds of forming processes may be used together depending on the shape of a bent glass which should be obtained after forming.

The sheet glass or the bent glass as a body to be formed, or the bent glass article glass (hereinafter referred to as a material to be processed) may be subjected to the following steps/treatments.

Grinding/Polishing Step

At least one main surface of the material to be processed may be subjected to a grinding/polishing process. It is preferred that the first main surface in contact with a mold used for forming is polished.

Surface Treatment Step

A step of forming various surface treatment layers may be performed on the material to be processed, if necessary. Examples of the surface treatment layers include an antiglare treatment layer, an antireflection treatment layer, an antifouling treatment layer, etc., and these may be used in combination. The surface treatment may be performed on either the first main surface or the second main surface of the material to be processed. The layers are preferably formed after the forming step or the annealing step, but the antiglare treatment layer may be formed before the forming step.

Antiglare Treatment Layer

The antiglare treatment layer is a layer producing an effect of scattering mainly reflected light and thereby reducing the glare of reflected light caused by reflection of a light source. The antiglare treatment layer may be formed by processing the surface of the material to be processed or may be separately deposited. As the method for forming the antiglare treatment layer, for example, a method in which surface treatment is performed on at least a part of the material to be processed by chemical (e.g. etching) or physical (e.g. sandblast) method to thereby form a concave-convex profile with a desired surface roughness may be used. In addition, as the formation method, a processing solution may be applied to or sprayed on at least a part of the material to be process to thereby form a concave-convex profile on the plate.

Furthermore, a concave-convex profile may be formed on at least a part of the material to be processed by a thermal method.

Antireflection Treatment Layer

The antireflection treatment layer is a layer that produces an effect of reducing the reflectance, bringing reduction in the glare caused by reflection of light, and in the case of using it for a display device, the antireflection treatment layer can increase the transmittance of light from the display device and improve the visibility of the display device.

In the case where the antireflection treatment layer is an antireflection film, the film is preferably formed on the first main surface or the second main surface of the material to be processed, but there is no limitation on this point. The configuration of the antireflection film is not limited as long as the reflection of light can be inhibited, and the film may have, for example, a configuration including a laminate of a high-refractive-index layer having a refractive index of 1.9 or more at a wavelength of 550 nm and a low-refractive-index layer having a refractive index of 1.6 or less at the same wavelength, or a configuration including a layer having a refractive index of 1.2 to 1.4 at a wavelength of 550 nm and including a film matrix in which hollow particles or pores have been mixed.

Antifouling Treatment Layer

The antifouling treatment layer is a layer for inhibiting attachment of an organic substance or an inorganic substance to the surface, or is a layer for facilitating removal of the attached substance by cleaning such as wiping-off even when an organic substance or an inorganic substance is attached to the surface.

In the case where the antifouling treatment layer is formed as an antifouling film, the film is preferably formed on one of the main surfaces of the material to be processed or on another surface treatment layer. The antifouling treatment is not limited as long as an antifouling property can be imparted. In particular, the film is preferably composed of a fluorine-containing organic silicon compound coat obtained by a hydrolysis and condensation reaction of a fluorine-containing organic silicon compound.

EXAMPLES

Next, examples of the present invention will be described below. The present invention is not limited to the following examples. Example 1 is an example of the invention, and Example 2 is a comparative example.

Each bent glass plate was obtained in the following procedure using a sheet glass (Dragontrail (registered trademark), manufactured by Asahi Glass Co., Ltd.) having a rectangular main surface having a size of 610 mm×294 mm×2 mm (thickness). In the following description, one of the main surfaces of the glass plate will be referred to as a first main surface, and the other main surface will be referred to as a second surface.

Example 1

(1) A preheating and forming steps, (2) an annealing step and (3) a chemically strengthening step were performed on the sheet glass in this order as follows.

(1) Preheating and Forming Steps

The sheet glass was formed in the following procedure, and a bent glass was obtained.

First, the sheet glass was placed on a conveyance arm, and in this state, the sheet glass was conveyed to a preheating furnace. In the preheating furnace, the sheet glass was heated until the equilibrium viscosity thereof reached about $10^{12.5}$ Pa·s (preheating step). Successively, by the conveyance arm, the preheated sheet glass was placed on a lower mold having a surface shape by which a desired bent glass could be obtained. In this state, the sheet glass was conveyed to a softening furnace. In the softening furnace, the sheet glass was heated until the equilibrium viscosity thereof reached about $10^{7.7}$ Pa·s. After the sheet glass was stabilized in this state, the sheet glass was molded by its own weight following the surface shape of the lower mold (forming step). The temperature of the formed sheet glass was decreased at a rate of about 5° C./min (cooling step). Thus, a bent glass having a desired shape was obtained. The bent glass had a curvature part bent as a whole, and having a curvature radius of 1,000 mm. The curvature direction of the curvature part is defined as X-axis direction, a direction perpendicular to the X-axis direction and parallel with the thickness direction is defined as Z-axis direction, and a direction perpendicular to the X-axis and Z-axis directions is defined as Y-axis direction.

(2) Annealing Step

Successively, the obtained bent glass was annealed as follows. The obtained bent glass was placed on the support jig shown in FIG. 7, and conveyed into an annealing furnace. After that, heating was started to increase temperature at a rate of about 10° C./min until the equilibrium viscosity reached about $10^{14}$ Pa·s (heating step in annealing step). After the inside of the annealing furnace was stabilized at a desired temperature, the bent glass was held for 15 minutes at that temperature (holding step in annealing step), and then, the temperature was decreased at a rate of about 10° C./min (slowly cooling step). Thus, an annealed bent glass article was obtained.

(3) Chemically Strengthening Step

The annealed bent glass article was immersed into molten potassium nitrate salt heated to 450° C., for two hours, thereby performing ion exchange treatment. After that, the glass plate was taken from the molten salt, and slowly cooled down to room temperature for one hour, thereby performing chemically strengthening treatment.

Further, the bent glass article was immersed into an alkali solution (trade name: SUNWASH TL-75, manufactured by Lion Corporation) for 4 hours. Thus, alkali treatment was performed.

In this manner, five bent glass articles were obtained under the same conditions (Glass Samples A).

Example 2

The (1) preheating and forming steps and the (3) chemically strengthening step were performed on a sheet glass in the same procedure as in Example 1, except that the (2) annealing step was not performed. In this manner, five bent glass articles were obtained under the same conditions (Glass Samples B).

Evaluation Method

Various evaluations were performed by the following analyzing methods. Evaluation of Glass: Surface Compressive Stress (CS) and Depth of Surface Compressive Stress Layer (DOL)

The surface compressive stress (CS) and the depth of the surface compressive layer (DOL) (hereinafter referred to as stress distribution) of each glass sample were measured by a glass surface stress meter (FSM-6000LE) manufactured by ORIHARA Industrial Co., Ltd.

CS and DOL were measured at three points in total, that is, near the center and near the left and right ends within the glass sample surface. As for the DOL, an average deviation σ within the surface, which shows a variation within the surface, and a fluctuation ratio obtained as a ratio of the average deviation σ within the surface to an average value of the DOL within the surface wear also calculated.

Table 1 shows the results obtained. A plurality of glass samples produced under the same conditions is expressed as follows. That is, for example, the first and the second of Glass Samples A are referenced by A-1 and A-2, respectively.

both in the X-axis direction and in the Y-axis direction. On the other hand, in Glass Samples B which had not been annealed, the main stress differences were high about 10 MPa both in the X-axis direction and in the Y-axis direction, and a wide variation lied among the measurement places. Thus, it was found that residual stress within the surface could be removed from the whole surface by annealing.

In Glass Samples A, the variation of the depth of compressive stress layer (DOL) within the surface could be reduced. This was because the residual stress within the surface could be removed uniformly.

In addition, in Glass Samples A, as shown in Table 1, the surface compressive stress CS was higher than that in Glass Samples B. It was considered that residual stress remaining in each Glass Sample B in spite of ion exchange treatment performed on the Glass Sample B in the chemically strengthening step was relaxed, and with the result that residual stress in the chemically strengthened layer was also relaxed to reduce the surface compressive stress CS. Any one of obtained Glass Samples A had a high Young's modulus of 50 GPa or more.

As described above, residual stress remaining in a bent glass subjected to heat treatment at a high temperature could be removed by annealing, and a bent glass article in which a chemically strengthened layer hard to be relaxed and homogenous could be obtained.

As described above, the following aspects are described in the present description.

(1) A method for producing a bent glass article, comprising:

a heat treatment step of heat-treating a bent glass including a first main surface, a second main surface and an end face, wherein:

TABLE 1

| | | Surface Compressive Stress CS | | | | Depth of Surface Compressive Stress Layer DOL | | | | | |
|---|---|---|---|---|---|---|---|---|---|---|---|
| Bent Glass | Sample Name | Left end (MPa) | Center (MPa) | Right end (MPa) | Average (MPa) | Left end (μm) | Center (μm) | Right end (μm) | Average (μm) | Deviation σ within surface | Fluctuation rate (%) |
| A | A-1 | 820 | 834 | 814 | 823 | 25.5 | 24.8 | 24.4 | 24.9 | 0.40 | 2.3% |
|   | A-2 | 817 | 826 | 822 | 822 | 24.7 | 24.6 | 25.2 | 24.8 | 0.24 |   |
|   | A-3 | 828 | 836 | 821 | 828 | 24.6 | 26   | 24.6 | 25.1 | 0.62 |   |
|   | A-4 | 826 | 827 | 820 | 825 | 25.2 | 24.7 | 25.7 | 25.2 | 0.33 |   |
|   | A-5 | 822 | 829 | 818 | 823 | 26.6 | 24.6 | 23.4 | 24.9 | 1.16 |   |
| B | B-1 | 809 | 821 | 815 | 815 | 25.2 | 25.9 | 25.9 | 25.7 | 0.31 | 3.1% |
|   | B-2 | 815 | 820 | 813 | 816 | 25.7 | 25.1 | 25.1 | 25.3 | 0.27 |   |
|   | B-3 | 813 | 818 | 820 | 817 | 24.7 | 26.9 | 24.8 | 25.5 | 0.96 |   |
|   | B-4 | 807 | 819 | 813 | 813 | 26.9 | 27.1 | 24.9 | 26.3 | 0.93 |   |
|   | B-5 | 813 | 825 | 815 | 818 | 26.9 | 26.9 | 26.8 | 26.9 | 0.04 |   |

Evaluation of Glass: Main Stress Difference

Main stress differences of each glass sample were measured by a wide range birefringence analysis system (model number WPA-100) manufactured by Photonic Lattice, Inc.

Figure 12:
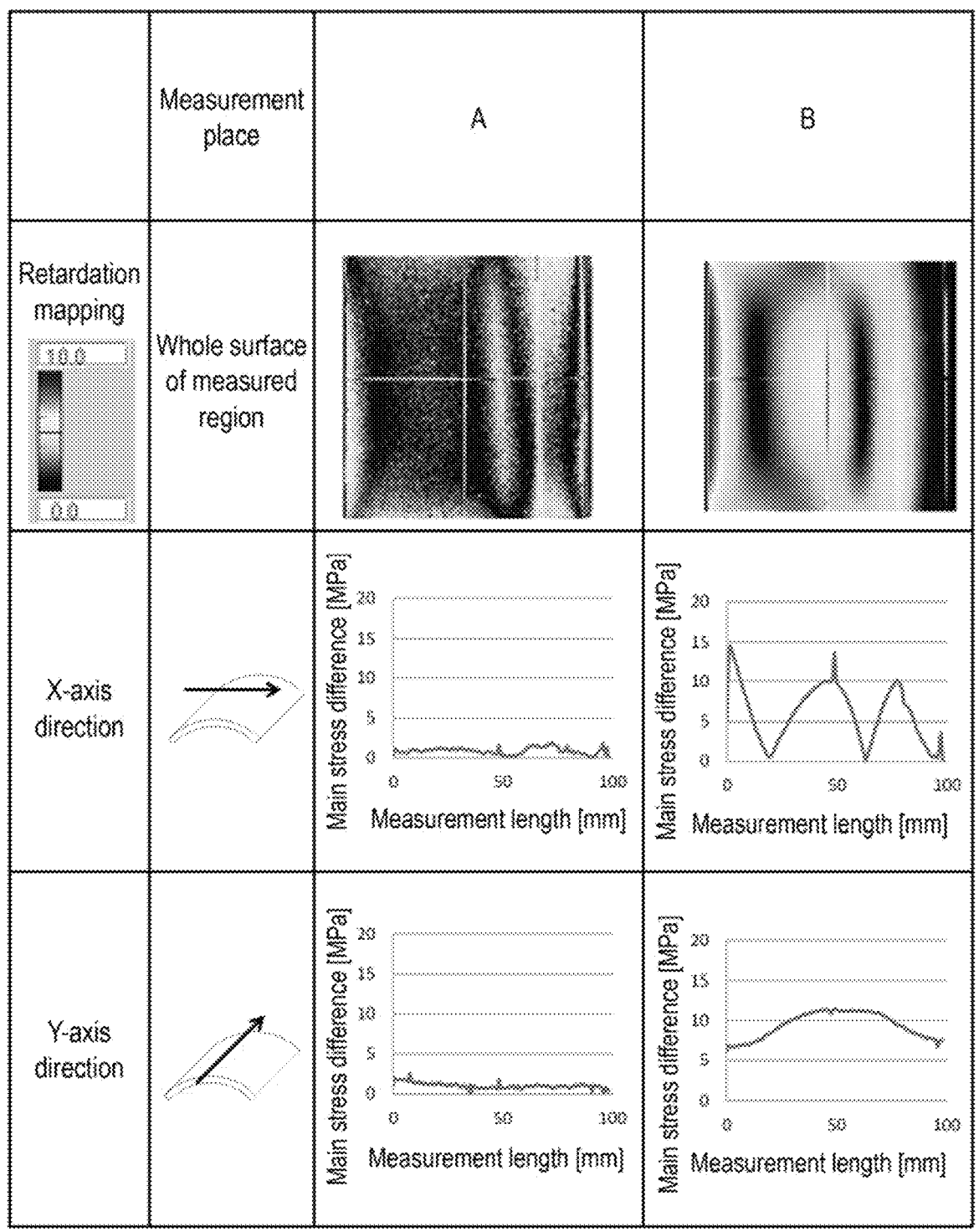
FIG. 12 shows measurement results of main stress difference of glass samples.

Within the glass sample surface, of the main surfaces of the glass sample, the surface in no contact with the lower mold was used for measurement of the main stress. The measurement was performed for main stress differences in the X-axis direction and in the Y-axis direction, each of which was measured at a measurement length of 100 mm. For the measurement of the main stress, the sample A-1 was used among the Glass Samples A, and the sample B-1 was used among the Glass Samples B. FIG. 12 shows the results obtained.

In Glass Samples A which had been annealed, as shown in FIG. 12, the main stress difference were 5 MPa or less in the heat treatment step, the bent glass is supported by a support jig with one of the main surfaces facing downward; and the support jig supports at least a part of one of the main surfaces or the end face in a higher position than the lowest position of one of the main surfaces.

According to the production method of the bent glass article, it is possible to perform heat treatment while suppressing the bent glass from being deformed.

(2) The method according to (1), wherein the heat treatment step is an annealing step.

According to the production method of the bent glass article, it is possible to remove residual strain or residual stress inside the bent glass by annealing and suppress the bent glass from being deformed during the annealing.

(3) The method according to (1) or (2), further comprising:

a forming step of bringing a sheet glass into contact with a mold to form the bent glass, wherein in the heat treatment step, the surface of the bent glass which was in contact with the mold is supported by the support jig:

According to the production method of the bent glass article, when main surface(s) are polished or ground in a subsequent step, a first surface may be polished selectively. In such a manner, it is possible to reduce a load in the subsequent step.

(4) The method according to (3), wherein the heat treatment step is performed after the bent glass obtained in the forming step is cooled at a cooling rate of 5° C./min or more in a region where equilibrium viscosity of the bent glass is from $10^{12.5}$ Pa·s to $10^{20}$ Pa·s.

According to the production method of the bent glass article, the bent glass is cooled at a high cooling rate of 5° C./min or more before the heat treatment step, and even if residual strain or residual stress occurs inside the bent glass, the residual strain or the residual stress can be removed easily.

(5) The method according to any one of (1) to (4), wherein in the heat treatment step, the bent glass is heated until equilibrium viscosity of the bent glass reaches a range of from $10^{12.5}$ Pa·s to $10^{17}$ Pa·s.

According to the production method of the bent glass article, the residual strain or the residual stress inside the bent glass can be removed more surely.

(6) The method according to any one of (1) to (5), wherein the heat treatment step comprises a heating step of heating the bent glass to a predetermined temperature, and a slowly cooling step.

According to the production method of the bent glass article, the bent glass is heated to an annealing temperature and then cooled slowly, so that occurrence of residual strain or residual stress inside the bent glass can be suppressed.

(7) The method according to (6), further comprising:

a chamfering step of chamfering at least a part of the bent glass after the slowly cooling step.

According to the production method of the bent glass article, an edge portion of the bent glass can be smoothed by chamfering. In addition, fine damages can be removed from the edge portion.

(8) The method according to (7), wherein in the chamfering step, the end face of the bent glass is chamfered.

According to the production method of the bent class article, the end face is made so smooth that the dimensional accuracy of the bent glass can be enhanced. In addition, handleability of an operator can be improved. Thus, the commercial value of the bent glass can be improved.

(9) The method according to any one of (6) to (8), farther comprising:

a cutting step of cutting at least a part of the bent glass after the slowly cooling step.

According to the production method of the bent glass article, the appearance or dimensions of the bent glass can be adjusted depending on its design shape.

(10) The method according to (9), wherein in the cutting step, a peripheral part including the end face in the bent glass is cut off.

According to the production method of the bent glass article, even if damages, contact marks, etc. are generated in the surface of the bent glass held by the support jig, for example, during annealing, a peripheral portion where the damages, the contact marks, etc. are generated can be removed.

(11) A bent glass article comprising:

a first main surface;

a second main surface;

an end face; and a curvature part provided at least partially, wherein:

the bent glass article comprises a chemically strengthened glass; and in the first main surface or the second main surface, a fluctuation ratio obtained as a ratio of an average deviation of a depth of compressive stress layer DOL within the surface to an average value of the DOL within the surface is 3% or less.

The bent glass article has a small deviation of compressive stress within the surface thereof. Thus, homogenous strength can be obtained.

(12) The bent glass article according to (11), wherein a main stress difference in one of the main surfaces is 5 MPa less.

The bent glass article is less in image distortion and good in image display, and can be prevented from being broken for a long time.

(13) A bent, glass article comprising:

a first main surface;

a second main surface;

an end face; and a curvature part provided at least partially, wherein a main stress difference near the end face in one of the main surfaces is 5 MPa or less.

Through a cutting step, a chamfering step, a chemically strengthening step, etc., damages or the like can be suppressed in the bent glass article. Thus, the bent glass article is high in efficiency and high in quality.

(14) The bent glass article according to (13), wherein a main stress difference in the curvature part in one of the main surfaces is 5 MPa or less.

The bent glass article has a low main stress difference and is uniform in the main stress difference both in the curvature part and in the vicinities of end faces. Thus, distortion can be reduced.

(15) The bent glass article according to (13) or (14), comprising a chemically strengthened glass.

In the bent glass article, a bent glass article high in mechanical strength can be obtained.

(16) The bent glass article according to any one of (11) to (15), which has a Young's modulus of 45 GPa or more.

In the bent glass article, homogenous strength can be obtained, and a shape following a design can be obtained.

(17) The bent glass article according to any one of (11) to (16), which has a Young's modulus of 90 GPa or less.

In the bent glass article, deformation can be suppressed even if a load is applied to the glass due to pressure or the like. Thus, the shape accuracy of the glass can be retained.

(18) The bent glass article according to any one of (11) to (17), wherein the curvature part has a curvature radius of 5,000 mm or less.

Although the bent glass article includes the curvature part having a small curvature radius, residual stress or the like can be removed by annealing. Thus, the state of high dimensional accuracy can be retained so that uniform chemical strengthening can be performed easily.

(19) The bent glass article according to any one of (11) to (18), wherein the curvature part includes a twisted structure.

Although the bent glass article has a complicated shape like a twisted structure, residual stress or the like can be removed by annealing. Thus, the state of high dimensional accuracy can be retained so that uniform chemical strengthening can be performed easily.

DESCRIPTION OF REFERENCE NUMERALS AND SIGNS 10,20,30,40,50,60,70 Support jig
15,51 Mounting surface (support portion)
65,77A,77B Support portion
100 Bent glass
101 First main surface
103 Peripheral portion
105 End face

The invention claimed is:

1. A bent glass article comprising:
   a first main surface;
   a second main surface;
   an end face; and
   a curvature part provided at least partially,
   wherein a main stress difference near the end face in one of the main surfaces is 5 MPa or less.

2. The bent glass article according to claim 1, wherein a main stress difference in the curvature part in one of the main surfaces is 5 MPa or less.

3. The bent glass article according to claim 1, comprising a chemically strengthened glass.

4. The bent glass article according to claim 1, which has a Young's modulus of 45 GPa or more.

5. The bent glass article according to claim 1, which has a Young's modulus of 90 GPa or less.

6. The bent glass article according to claim 1, wherein the curvature part has a curvature radius of 5,000 mm or less.

7. A method for producing the bent glass article of claim 1, comprising:
   heat-treating a bent glass including a first main surface, a second main surface and an end face,
   while the bent glass is supported by a support jig with one of the main surfaces facing downward such that the support jig supports at least a part of the one of the main surfaces or the end face in a higher position than the lowest position of the one of the main surfaces.

8. The method according to claim 7, wherein the heat treatment is an annealing.

9. The method according to claim 7, further comprising:
   contacting a sheet glass with a mold to form the bent glass,
   wherein in the heat treatment, the surface of the bent glass which was in contact with the mold is supported by the support jig.

10. The method according to claim 9, wherein the heat treatment is performed after the bent glass is cooled at a cooling rate of 5° C./min or more in a region where equilibrium viscosity of the bent glass is from $10^{12.5}$ Pa·s to $10^{20}$ Pa·s.

11. The method according to claim 7, wherein in the heat treatment, the bent glass is heated until equilibrium viscosity of the bent glass reaches a range of from $10^{12.5}$ Pa·s to $10^{17}$ Pa·s.

12. The method according to claim 7, wherein the heat treatment comprises heating the bent glass to a predetermined temperature, and slowly cooling.

13. The method according to claim 12, further comprising:
   chamfering at least a part of the bent glass after the slowly cooling.

14. The method according to claim 13, wherein in the chamfering, the end face of the bent glass is chamfered.

15. The method according to claim 12, further comprising:
   cutting at least a part of the bent glass after the slowly cooling.

16. The method according to claim 15, wherein in the cutting, a peripheral part including the end face in the bent glass is cut off.

17. The bent glass article according to claim 1, wherein the curvature part includes a twisted structure.

* * * * *